(12) United States Patent
Yang et al.

(10) Patent No.: US 12,127,286 B2
(45) Date of Patent: Oct. 22, 2024

(54) WIRELESS COMMUNICATION METHOD AND TERMINAL DEVICE

(71) Applicant: VIVO MOBILE COMMUNICATION CO., LTD., Guangdong (CN)

(72) Inventors: Xiaodong Yang, Dongguan (CN); Yue Ma, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 586 days.

(21) Appl. No.: 17/378,588

(22) Filed: Jul. 16, 2021

(65) Prior Publication Data
US 2021/0345432 A1    Nov. 4, 2021

Related U.S. Application Data

(63) Continuation of application No. PCT/CN2020/072546, filed on Jan. 16, 2020.

(30) Foreign Application Priority Data

Jan. 18, 2019    (CN) .......................... 201910058738.6

(51) Int. Cl.
*H04W 76/16* (2018.01)
*H04W 8/20* (2009.01)
*H04W 76/19* (2018.01)
*H04W 76/28* (2018.01)

(52) U.S. Cl.
CPC ............ *H04W 76/16* (2018.02); *H04W 8/20* (2013.01); *H04W 76/19* (2018.02); *H04W 76/28* (2018.02)

(58) Field of Classification Search
None
See application file for complete search history.

(56) References Cited

U.S. PATENT DOCUMENTS 9,521,563 B2    12/2016   Su et al.
10,057,757 B2    8/2018   Callender et al.
10,278,135 B2    4/2019   Yi et al.
(Continued)

FOREIGN PATENT DOCUMENTS

CA    3061095 A1    11/2018
CN    105451364 A    3/2016
(Continued)

OTHER PUBLICATIONS

First Office Action regarding Japanese Patent Application No. 2021-541518, dated Aug. 19, 2022. Translation provided by Bohui Intellectual Property.
(Continued)

*Primary Examiner* — Christine T Duong
(74) *Attorney, Agent, or Firm* — Harness, Dickey & Pierce, P.L.C.

(57) ABSTRACT

A wireless communication method includes sending indication information to at least one target network side device. The target network side device is a network side device that has established an RRC with the terminal device or that is establishing or resuming an RRC connection with the terminal device, and the indication information is used to indicate that the terminal device does not expect to receive a dual connectivity configuration, and/or the indication information is used to indicate a carrier that the terminal device does not expect to configure.

10 Claims, 9 Drawing Sheets

(56) References Cited

U.S. PATENT DOCUMENTS

| | | |
|---|---|---|
| 11,140,704 B2 | 10/2021 | Lin et al. |
| 2014/0220981 A1* | 8/2014 | Jheng ............ H04W 76/25 455/437 |
| 2016/0142992 A1 | 5/2016 | Chien et al. |
| 2017/0127473 A1* | 5/2017 | Virtej ............ H04W 76/38 |

FOREIGN PATENT DOCUMENTS

| | | |
|---|---|---|
| CN | 105874875 A | 8/2016 |
| CN | 106067827 A | 11/2016 |
| CN | 106797289 A | 5/2017 |
| CN | 108242991 A | 7/2018 |
| CN | 108289019 A | 7/2018 |
| CN | 108513698 A | 9/2018 |
| CN | 108886828 A | 11/2018 |
| EP | 2424067 A1 | 2/2012 |
| EP | 3099108 A1 | 11/2016 |
| JP | 2017505575 A | 2/2017 |
| WO | WO-2012134219 A3 | 1/2013 |
| WO | WO-2017124327 A1 | 7/2017 |
| WO | WO-2018182972 A1 | 10/2018 |
| WO | WO-2018219333 A1 | 12/2018 |
| WO | WO-2018227484 A1 | 12/2018 |

OTHER PUBLICATIONS

Supplementary European Search Report regarding European Patent Application No. EP20741084.6-1216, dated Sep. 29, 2022.

First Office Action regarding Chinese Patent Application No. 201910058738.6, mailed Nov. 19, 2020. Translation provided by Bohui Intellectual Property.

Second Office Action regarding Chinese Patent Application No. 201910058738.6, mailed Mar. 5, 2021. Translation provided by Bohui Intellectual Property.

International Search Report and Written Opinion issued in PCT/CN2020/072546, mailed Apr. 20, 2020. Translation provided by Bohui Intellectual Property.

* cited by examiner

WIRELESS COMMUNICATION METHOD AND TERMINAL DEVICE

CROSS-REFERENCE TO RELATED APPLICATIONS

This application is a Bypass Continuation Application of PCT/CN2020/072546 filed on Jan. 16, 2020, which claims priority to Chinese Patent Application No. 201910058738.6 filed on Jan. 18, 2019, which are incorporated herein by reference in their entirety.

TECHNICAL FIELD

This application relates to the field of communications technologies, and in particular, to a wireless communication method and a terminal device.

BACKGROUND

With development of terminal technologies and wireless communication technologies, a terminal device is no longer limited to be installed with one subscriber identity module (SIM) card, and instead can be installed with two or more SIM cards, and can access a wireless communication network through each installed SIM card, so that a user can use, through one terminal device, services provided by multiple wireless network systems.

SUMMARY

The embodiments of this application provide a wireless communication method and a terminal device.

According to a first aspect, the embodiments of this application provide a wireless communication method, applied to a terminal device, where the method includes:
  sending indication information to at least one target network side device;
  where the target network side device is a network side device that has established a radio resource control connection with the terminal device or a network side device that is establishing or resuming an RRC connection with the terminal device, and the indication information is used to indicate that the terminal device does not expect to receive a dual connectivity configuration, and/or the indication information is used to indicate a carrier that the terminal device does not expect to configure.

According to a second aspect, the embodiments of this application provide a wireless communication method, applied to a network side device, where the method includes:
  receiving indication information sent by a terminal device, where the indication information is used to indicate that the terminal device does not expect to receive a dual connectivity configuration, and/or the indication information is used to indicate an identifier of a carrier that the terminal device does not expect to configure; and
  in the case where the indication information is used to indicate that the terminal device does not expect to receive a DC configuration, and a first condition is satisfied and a second condition is not satisfied, skipping configuring DC for the terminal device; where the first condition is: a condition under which the network side device configures DC for the terminal device in the case where the indication information is not received; or
  in the case where the indication information is used to indicate the identifier of the carrier that the terminal device does not expect to configure, and a third condition is satisfied and a fourth condition is not satisfied, skipping configuring the carrier indicated by the identifier for the terminal device; where the third condition is: a condition under which the network side device configures the carrier indicated by the identifier for the terminal device in the case where the indication information is not received.

According to a third aspect, the embodiments of this application provide a wireless communication method, applied to a terminal device, where the method includes:
  sending indication information to at least one target network side device;
  where the target network side device is a network side device that has established a radio resource control connection with the terminal device or a network side device that is establishing or resuming an RRC connection with the terminal device; the indication information is used to indicate a target downlink receiving channel set, or a target downlink receiving carrier set, or a time division multiplexing pattern of each downlink receiving channel of target downlink receiving channels, or a time-division multiplexing pattern of each downlink receiving carrier in the target downlink receiving carrier set; the target downlink receiving channel set is a set formed by a downlink receiving channel with downlink reception; and the target downlink receiving carrier set is a set formed by a downlink receiving carrier with downlink receiving.

According to a fourth aspect, the embodiments of this application provide a wireless communication method, applied to a network side device, where the method includes:
  receiving indication information sent by a terminal device, where the network side device has established a radio resource control connection with the terminal device or a network side device is establishing or resuming an RRC connection with the terminal device; the indication information is used to indicate a target downlink receiving channel set, or a target downlink receiving carrier set, or a time division multiplexing pattern of each downlink receiving channel of target downlink receiving channels, or a time-division multiplexing pattern of each downlink receiving carrier in the target downlink receiving carrier set; the target downlink receiving channel set is a set formed by a downlink receiving channel with downlink reception; and the target downlink receiving carrier set is a set formed by a downlink receiving carrier with downlink receiving; and
  when configuring dual connectivity for the terminal device, configuring a downlink receiving channel of a master cell group of the DC and a downlink receiving channel of a secondary cell group of the DC based on the indication information.

According to a fifth aspect, the embodiments of this application provide a wireless communication method, applied to a terminal device, where the method includes:
  when a preset condition is satisfied, sending first indication information to a first network side device;
  where the first network side device is a master base station and/or a secondary base station that establishes dual connectivity with a first subscriber identity module card of the terminal device; the first indication information is used to instruct the first network side device to suspend receiving, on a target uplink sending channel or a target uplink sending carrier, uplink information sent by the first SIM card, or instruct the first network side device to receive, on a target uplink sending channel or a target uplink sending carrier, a discontinuous reception pattern of uplink information sent by the terminal device; the target uplink sending channel is an uplink sending channel used by the first SIM card to send the uplink information to the MeNB and/or an uplink sending channel used by the first SIM card to send the uplink information to the SeNB; and the target uplink sending carrier is an uplink sending carrier used by the first SIM card to send the uplink information to the MeNB and/or an uplink sending carrier used by the first SIM card to send the uplink information to the SeNB.

According to a sixth aspect, the embodiments of this application provide a wireless communication method, applied to a network side device, where the method includes:

receiving indication information sent by a target terminal device; and in the case where the indication information is used to instruct the network side device to suspend receiving, on a target uplink sending channel or a target uplink sending carrier, uplink information sent by the terminal device, suspending receiving, on the target uplink sending channel or the target uplink sending carrier, the uplink information sent by the terminal device; or in the case where the indication information is used to instruct the network side device to receive, on a target uplink sending channel or a target uplink sending carrier according to a target discontinuous reception pattern, the uplink information sent by the terminal device, receiving, on the target uplink sending channel or the target uplink sending carrier according to the target DRX pattern, the uplink information sent by the terminal device.

According to a seventh aspect, the embodiments of this application provide a terminal device, including:

a sending unit, configured to: when a preset condition is satisfied, send indication information to at least one target network side device;

where the target network side device is a network side device that has established a radio resource control connection with the terminal device or a network side device that is establishing or resuming an RRC connection with the terminal device, and the indication information is used to indicate that the terminal device does not expect to receive a dual connectivity configuration, or the indication information is used to indicate an identifier of a carrier that the terminal device does not expect to configure.

According to an eighth aspect, the embodiments of this application provide a network side device, including:

a receiving unit, configured to: receive indication information sent by a terminal device, where the indication information is used to indicate that the terminal device does not expect to receive a dual connectivity configuration, or the indication information is used to indicate a carrier that the terminal device does not expect to configure; and a processing unit, configured to: in the case where the indication information is used to indicate that the terminal device does not expect to receive a DC configuration, and a first condition is satisfied and a second condition is not satisfied, skip configuring DC for the terminal device; where the first condition is: a condition under which the network side device configures DC for the terminal device in the case where the indication information is not received; or in the case where the indication information is used to indicate the identifier of the carrier that the terminal device does not expect to configure, and a third condition is satisfied and a fourth condition is not satisfied, skip configuring the carrier indicated by the identifier for the terminal device; where the third condition is: a condition under which the network side device configures the carrier indicated by the identifier for the terminal device in the case where the indication information is not received.

According to a ninth aspect, the embodiments of this application provide a terminal device, including:

a sending unit, configured to send indication information to at least one target network side device;

where the target network side device is a network side device that has established a radio resource control connection with the terminal device or a network side device that is establishing or resuming an RRC connection with the terminal device; the indication information is used to indicate a target downlink receiving channel set, or a target downlink receiving carrier set, or a time division multiplexing pattern of each downlink receiving channel of target downlink receiving channels, or a time-division multiplexing pattern of each downlink receiving carrier in the target downlink receiving carrier set; the target downlink receiving channel set is a set formed by a downlink receiving channel with downlink reception; and the target downlink receiving carrier set is a set formed by a downlink receiving carrier with downlink receiving.

According to a tenth aspect, the embodiments of this application provide a network side device, including:

a receiving unit, configured to receive indication information sent by a terminal device, where the network side device has established a radio resource control connection with the terminal device or a network side device is establishing or resuming an RRC connection with the terminal device; the indication information is used to indicate a target downlink receiving channel set, or a target downlink receiving carrier set, or a time division multiplexing pattern of each downlink receiving channel of target downlink receiving channels, or a time-division multiplexing pattern of each downlink receiving carrier in the target downlink receiving carrier set; the target downlink receiving channel set is a set formed by a downlink receiving channel with downlink reception; and the target downlink receiving carrier set is a set formed by a downlink receiving carrier with downlink receiving; and a processing unit, configured to: when configuring dual connectivity for the terminal device, configure a downlink receiving channel of a master cell group and a downlink receiving channel of a secondary cell group based on the indication information.

According to an eleventh aspect, the embodiments of this application provide a terminal device, including:

a sending unit, configured to: when a preset condition is satisfied, send first indication information to a first network side device;

where the first network side device is a master base station and/or a secondary base station that establishes dual connectivity with a first subscriber identity module card of the terminal device; the first indication information is used to instruct the first network side device to suspend receiving, on a target uplink sending channel or a target uplink sending carrier, uplink information sent by the first SIM card, or instruct the first network side device to receive, on a target uplink sending channel or a target uplink sending carrier, a discontinuous reception pattern of uplink information sent by the terminal device; the target uplink sending channel is an uplink sending channel used by the first SIM card to send the uplink information to the MeNB and/or an uplink sending channel used by the first SIM card to send the uplink information to the SeNB; and the target uplink sending carrier is an uplink sending carrier used by the first SIM card to send the uplink information to the MeNB and/or an uplink sending carrier used by the first SIM card to send the uplink information to the SeNB.

According to a twelfth aspect, the embodiments of this application provide a network side device, including:

a receiving unit, configured to receive indication information sent by a target terminal device; and a processing unit, configured to: in the case where the indication information is used to instruct the network side device to suspend receiving, on a target uplink sending channel or a target uplink sending carrier, uplink information sent by the terminal device, suspend receiving, on the target uplink sending channel or the target uplink sending carrier, the uplink information sent by the terminal device; or in the case where the indication information is used to instruct the network side device to receive, on a target uplink sending channel or a target uplink sending carrier according to a target discontinuous reception pattern, the uplink information sent by the terminal device, receive, on the target uplink sending channel or the target uplink sending carrier according to the target DRX pattern, the uplink information sent by the terminal device.

According to a thirteenth aspect, the embodiments of this application provide a terminal device, including a processor, a memory, and a computer program that is stored in the memory and that executable on the processor, and when the computer program is executed by the processor, steps of the wireless communication methods provided in any one of the first aspect, the third aspect, and the fifth aspect are implemented.

According to a fourteenth aspect, the embodiments of this application provide a network side device, including a processor, a memory, and a computer program that is stored in the memory and that executable on the processor, and when the computer program is executed by the processor, steps of the wireless communication methods provided in any one of the second aspect, the fourth aspect, and the sixth aspect are implemented.

According to a fifteenth aspect, the embodiments of this application provide a non-transitory computer-readable storage medium, where a computer program is stored in the non-transitory computer-readable storage medium. When the computer program is executed by a processor, steps of the wireless communication methods provided in any one of the first aspect to the sixth aspect are implemented.

DETAILED DESCRIPTION OF EMBODIMENTS

Figure 1:
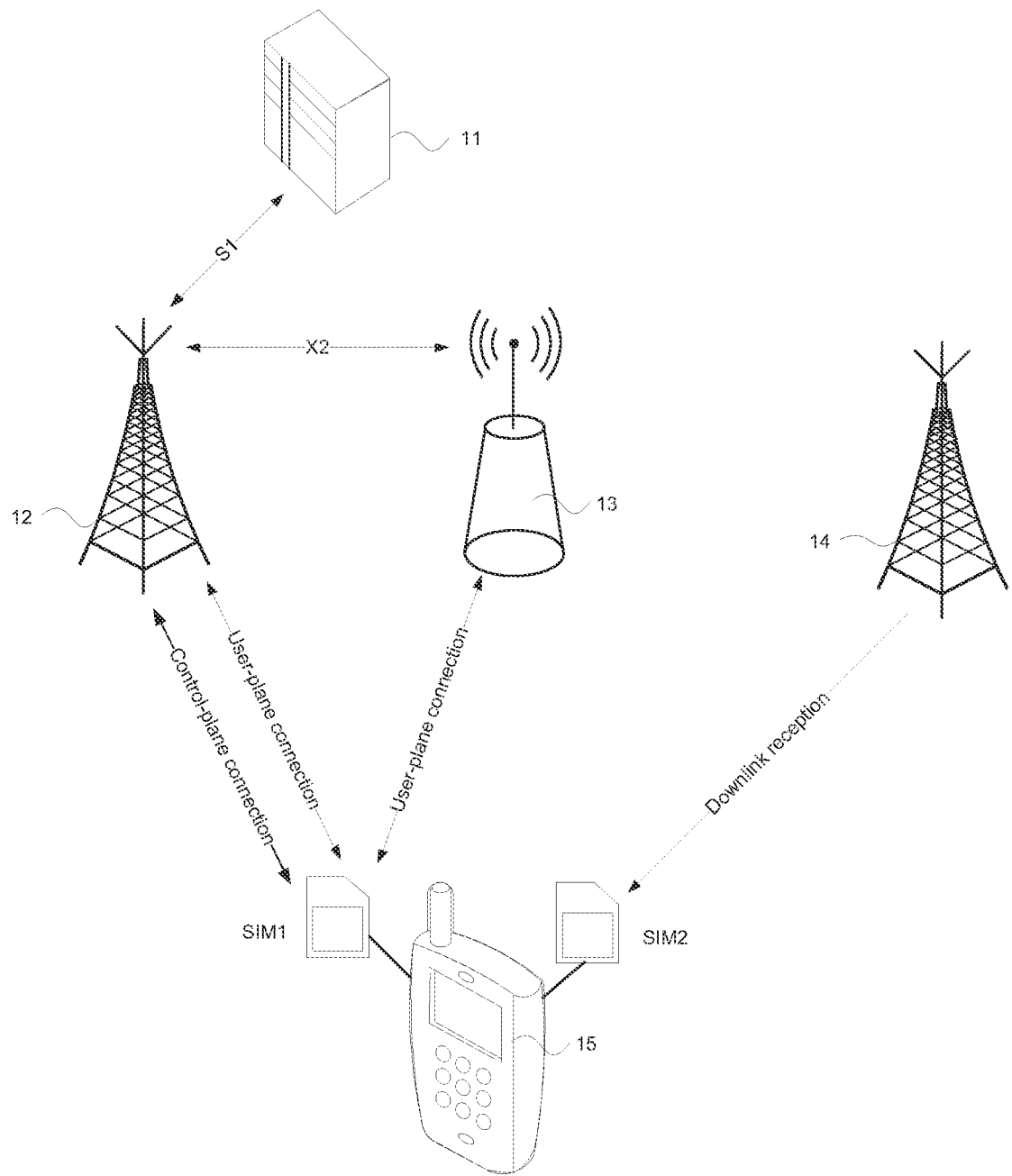
FIG. 1 is a possible schematic structural diagram of a communications system according to an embodiment of this application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In this specification, the term "and/or" is merely an association relationship that describes associated objects, and represents that there may be three relationships. For example, A and/or B may represent three cases: only A exists, both A and B exist, and only B exists. In addition, the character "/" in this specification generally indicates that associated objects are in an "or" relationship. In a formula, the character "/" indicates that associated objects are in a "divided" relationship. If not stated, "a plurality of" in this specification means two or more.

For ease of clearly describing the technical solutions in the embodiments of this application, in the embodiments of this application, the words "first" and "second" are used to distinguish between same or similar items with basically the same functions or effects. A person skilled in the art may understand that the words "first" and "second" do not limit a quantity and an execution sequence.

In the embodiments of this application, the term such as "exemplary" or "for example" is used to indicate an example, an instance, or a description. Any embodiment or design scheme described as "exemplary" or "an example" in the embodiments of this application should not be construed as being preferable or advantageous than other embodiments or design schemes. Specifically, the words such as "exemplary" or "for example" are used to present related concepts in a specific manner. In the description of the embodiments of this application, unless otherwise specified, the meaning of "a plurality of" means two or more.

Due to limited bandwidth resources and coverage of a single base station, it is often necessary to concentrate radio resources of multiple cells or base stations to provide services to users, to meet capacity and coverage requirements of users. This method is usually called multi-connection. Commonly used multi-connection methods include carrier aggregation, coordinated multiple points transmission/reception (CoMP), dual connectivity (DC), and the like. However, for a terminal device installed with multiple SIM cards, if a network side device configures DC or configures some carriers for one of the multiple SIM cards installed in the terminal device, signal transmission of another SIM card in the terminal device may be affected. For example, for a terminal device with dual SIM cards that supports dual downlink, when DC is not configured, each of the two SIM cards occupies one downlink receiving channel, and the terminal device can receive downlink information sent by both network side devices connected to the two SIM cards. However, if a network side device connected to one SIM card configures DC for the terminal device, the SIM card needs to occupy two downlink receiving channels, which affects receiving of a downlink signal of the other SIM card.

In order to solve this problem, the embodiments of this application provide a wireless communication method and a terminal device. In the wireless communication method, the terminal device sends indication information to the at least one target network side device; where the target network side device is a network side device that has established an RRC connection with the terminal device or a network side device that is establishing or resuming an RRC connection with the terminal device, and the indication information is used to indicate that the terminal device does not expect to receive a dual connectivity DC configuration, or the indication information is used to indicate an identifier of a carrier that the terminal device does not expect to configure. The terminal device indicates, to the network side device that has established an RRC connection or a network side device that is establishing or resuming an RRC connection with the terminal device, that the terminal device does not expect to receive a DC configuration or the identifier of the carrier that the terminal device does not expect to configure. Therefore, after receiving the indication information, the network side device can avoid configuring DC for the terminal device or configuring the carrier indicated by the identifier for the terminal device in some cases. Therefore, the embodiments of the present invention can prevent the wireless communication system from configuring DC or the carrier indicated by the identifier for the terminal device, to solve the problem that when a network side device configures DC or configures some carriers for one of multiple SIM cards installed in the terminal device, signal transmission of another SIM card of the terminal device may be affected.

The technical solutions provided in this application may be applied to various wireless communications systems, for example, a 5G communications system, a future evolved system, or a plurality of communications fusion systems. A plurality of application scenarios may be included, for example, machine-to-machine (M2M), D2M, macro-micro communication, enhanced mobile broadband (eMBB), ultra-reliable and low latency communication (uRLLC), and massive machine type communication (mMTC). These scenarios include but are not limited to scenarios such as communication between terminal devices, communication between network side devices, or communication between a network side device and a terminal device.

FIG. 1 is a possible schematic structural diagram of a communications system according to an embodiment of this application. As shown in FIG. 1, the communication system can include: a core network control entity (MME) 11, a first network side device 12, a second network side device 13, a third network side device 14, and a terminal device 15. Multiple SIM cards are installed in the terminal device 15 (for example, SIM card 1 and SIM card 2 are shown in FIG. 1). The SIM card 1 is in a connection state, and both a control-plane connection and a user-plane connection are established between the SIM card 1 and the network side device 12. A user-plane connection is established between the SIM card 1 and the network side device 13, but no control-plane connection is established between the SIM card 1 and the network side device 13. That is, the SIM card 1 is configured with DC, all service carriers configured on the first network side device 12 are called master cell groups (MCG) of the DC, and all service carriers configured on the second network side device 13 are called secondary cell groups (SCG) of the DC. The MCG includes at least one primary cell (PCell) and optionally includes one or more secondary cells (Scell). The SCG includes at least one primary secondary cell (PSCell) and optionally includes one or more SCells. The SIM card 2 is in an idle state (Idle), and the SIM card 2 receives, through the downlink connection with the network side device 14, a paging message sent by the network side device 14. The SIM card 2 performs downlink reception. In addition, the first network side device 12 and the second network side device 13 are connected through an X2 interface, and the first network side device 12 and the MME 11 are connected through an S1 interface. No signaling interaction link is established between the second network side device 13 and the MME 11, and the second network side device 13 performs signaling interaction with the MME 11 through forwarding by the first network side device 12.

For example, the network side device 14 (including the first network side device 12, the second network side device 13, and the third network side device 14) may be a base station, a core network device, a transmission and reception point (TRP), a relay station, an access point, or the like. The network side device may be a base transceiver station (BTS) in a global system for mobile communication (GSM) or a code division multiple access (CDMA) network, may be an NB (NodeB) in wideband code division multiple access (WCDMA), or may be an eNB or an eNodeB (evolved NodeB) in LTE. The network side device may be alternatively a wireless controller in a cloud radio access network (CRAN) scenario. The network side device may be alternatively a network side device in the 5G communications system or a network side device in a future evolved network.

The terminal device 15 may be a wireless terminal device. The wireless terminal device may be a device that provides voice and/or other service data connectivity for a user, a handheld device with a wireless communication function, a computing device, another processing device connected to a wireless modem, an in-vehicle device, a wearable device, a terminal device in a future 5G network, a terminal device in a future evolved PLMN network, or the like. The wireless terminal device may communicate with one or more core networks by using a radio access network (RAN). The wireless terminal device may be a mobile terminal, such as a mobile phone (or referred to as a "cellular" phone) and a computer with a mobile terminal. For example, the wireless terminal device may be a portable, pocket-sized, handheld, computer built-in, or in-vehicle mobile apparatus that exchanges voice and/or data with a radio access network, and a device such as a personal communication service (PCS) phone, a cordless phone, a session initiation protocol (SIP) phone, a wireless local loop (WLL) station, or a personal digital assistant (PDA). The wireless terminal may be alternatively a mobile device, a UE terminal, an access terminal, a wireless communications device, a terminal unit, a terminal station, a mobile station, a mobile console, a remote station, a remote terminal, a subscriber unit, a subscriber station, a user agent, a terminal apparatus, or the like. In an example, in this embodiment of this application, a mobile phone is shown as an example of the terminal device in FIG. 1.

Embodiment 1

Figure 2:
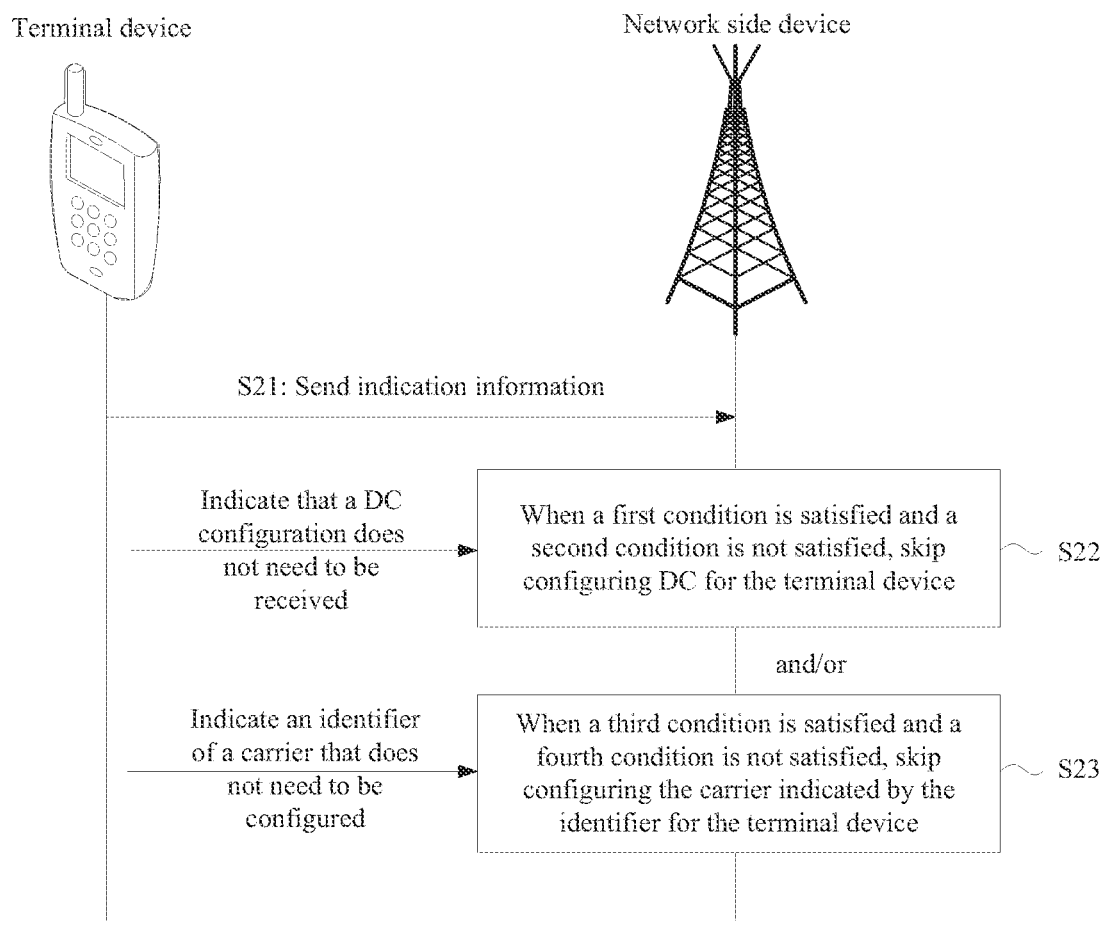
FIG. 2 is a first flowchart of interaction of a wireless communication method according to an embodiment of this application.

The embodiments of the present application provide a wireless communication method, and FIG. 2 is a flowchart of interaction of the wireless communication method according to the embodiments of this application. As shown in FIG. 2, the wireless communication method may include:

S21: A terminal device sends indication information to at least one target network side device.

Correspondingly, the at least one network side device receives the indication information sent by the terminal device, where the target network side device is a network side device that has established a radio resource control (RRC) connection with the terminal device or a network side device that is establishing or resuming an RRC connection with the terminal device, and the indication information is used to indicate that the terminal device does not expect to receive a dual connectivity DC configuration, and/or the indication information is used to indicate a carrier that the terminal device does not expect to configure.

That is, the sending the indication information to the at least one target network side device in step S21 includes the following implementations:

Implementation 1:

The terminal device sends, to the network side device that has established an RRC connection with the terminal device, the indication information used to indicate that the terminal device does not expect to receive a DC configuration.

Implementation 2:

The terminal device sends, to the network side device that is establishing an RRC connection with the terminal device, the indication information used to indicate that the terminal device does not expect to receive a DC configuration.

Implementation 3:

The terminal device sends, to the network side device that is resuming an RRC connection with the terminal device, the indication information used to indicate that the terminal device does not expect to receive a DC configuration.

Implementation 4:

The terminal device sends, to the network side device that has established an RRC connection with the terminal device, the indication information that includes an identifier of a carrier that the terminal device does not expect to configure.

Implementation 5:

The terminal device sends, to the network side device that is establishing an RRC connection with the terminal device, the indication information that includes an identifier of a carrier that the terminal device does not expect to configure.

Implementation 6:

The terminal device sends, to the network side device that is resuming an RRC connection with the terminal device, the indication information that includes an identifier of a carrier that the terminal device does not expect to configure.

In addition, it should be noted that in step S21, the sending indication information to the at least one target network side device can include any one of implementations 1 to 6, or can include two or more of implementations 1 to 6, which is not limited in the embodiments of the present invention.

It should be noted that, in the embodiments of the present invention, a trigger condition for triggering the terminal device to send indication information to the at least one target network side device is not limited, as long as the terminal device can be triggered to send indication information to the at least one target network side device.

For example, the trigger condition for triggering the terminal device to send indication information to the at least one target network side device can be: at least one SIM card of the terminal device has established an RRC connection with the network side device or is establishing or resuming an RRC connection with the network side device, and all downlink receiving channels of the terminal device perform downlink reception.

That is, step S21 (the terminal device sends indication information to the at least one target network side device) includes: in the case where at least one SIM card of the terminal device has established an RRC connection with the network side device or is establishing or resuming an RRC connection with the network side device, and the at least one SIM card of the terminal device is in an idle state, the terminal device sends the indication information to the at least one target network side device.

If the indication information is used to indicate that the terminal device does not expect to receive a DC configuration (including two scenarios: the indication information is only used to indicate that the terminal device does not expect to receive a DC configuration, and the indication information is used to indicate that the terminal device does not expect to receive a DC configuration and does not expect to be configured with a carrier), after step S21, the network side device that receives the indication information sent by the terminal device executes the following step S22.

S22: When a first condition is satisfied and a second condition is not satisfied, the network side device does not configure DC for the terminal device.

The first condition is: a condition under which the network side device configures DC for the terminal device in the case where the indication information is not received.

That is, after receiving the indication information sent by the terminal device, the network side device does not configure DC for the terminal device when the original condition for configuring DC for the terminal device is satisfied, and instead configures DC for the terminal device when the second condition is satisfied, to avoid configuring DC for the terminal device as much as possible.

If the indication information is used to indicate that the terminal device does not expect to be configured with a carrier (including two scenarios: the indication information is only used to indicate that the terminal device does not expect to be configured with a carrier, and the indication information is used to indicate that the terminal device does not expect to receive a DC configuration and does not expect to be configured with a carrier), after step S21, the network side device that receives the indication information sent by the terminal device executes the following step S23.

S23: When a third condition is satisfied and a fourth condition is not satisfied, the network side device does not configure the carrier indicated by the identifier for the terminal device.

The third condition is: a condition under which the network side device configures the carrier indicated by the identifier for the terminal device in the case where the indication information is not received.

That is, after receiving the indication information sent by the terminal device, the network side device does not configure the carrier indicated by the identifier for the terminal device when the original condition for configuring the carrier indicated by the identifier for the terminal device is satisfied, and instead configures the carrier indicated by the identifier for the terminal device when the fourth condition is satisfied, to avoid configuring the carrier indicated by the identifier for the terminal device as much as possible.

In the wireless communication method provided by the embodiments of the present invention, the terminal device sends indication information to the at least one target network side device; where the target network side device is a network side device that has established an RRC connection with the terminal device or a network side device that is establishing or resuming an RRC connection with the terminal device, and the indication information is used to indicate that the terminal device does not expect to receive a dual connectivity DC configuration, or the indication information is used to indicate a carrier that the terminal device does not expect to configure. The terminal device indicates, to the network side device that has established an RRC connection or a network side device that is establishing or resuming an RRC connection with the terminal device, that the terminal device does not expect to receive a DC configuration or the carrier that the terminal device does not expect to configure. Therefore, after receiving the indication information, the network side device can avoid configuring DC for the terminal device or configuring the carrier indicated by the identifier for the terminal device in some cases. Therefore, the embodiments of the present invention can prevent the wireless communication system from configuring DC or the carrier indicated by the identifier for the terminal device, to solve the problem that when a network side device configures DC or configures some carriers for one of multiple SIM cards installed in the terminal device, signal transmission of another SIM card of the terminal device may be affected.

Figure 3:
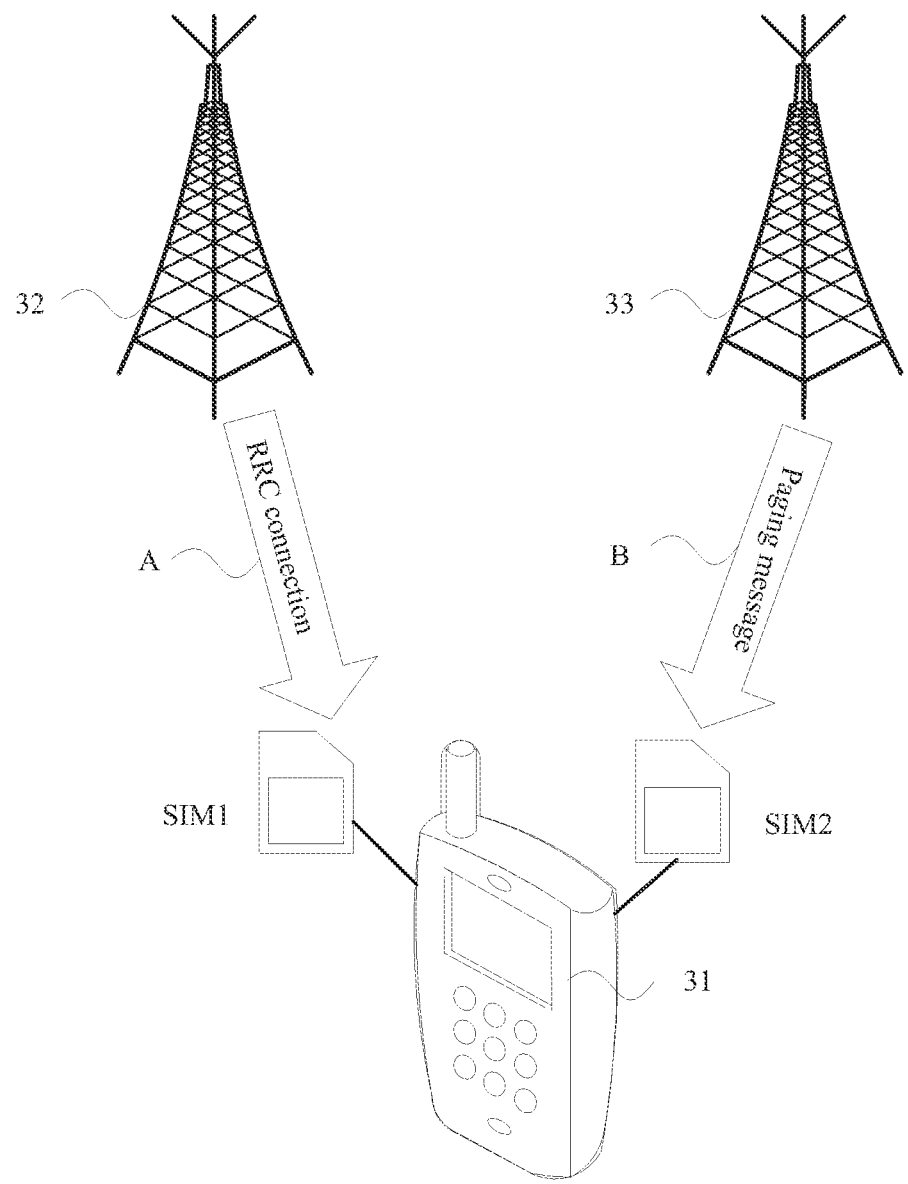
FIG. 3 is a first schematic diagram of an application scenario of a wireless communication method according to an embodiment of the application.

For example, the following uses an example in which the terminal device supports dual downlink reception and are installed with two SIM cards, where one SIM card is in a connection state and the other SIM card is in an idle state, to exemplarily describe the wireless communication solution provided in the above embodiment. As shown in FIG. 3, SIM card 1 of a terminal device 31 establishes an RRC connection with a network side device 32, and the RRC connection occupies downlink receiving channel A of the terminal device. SIM card 2 of the terminal device 31 is in an idle state and receives a paging message sent by a network side device 33. The paging message sent by the network side device 33 to SIM card 2 occupies downlink reception channel B of the terminal device.

One SIM card of the terminal device 31 is in the connection state and the other SIM card is in the idle state, the terminal device supports dual downlink reception, and each of the two SIM cards occupies a downlink receiving channel. Therefore, downlink reception of the two SIM cards does not affect each other, and the network side device 32 and the network side device 33 can send downlink information to the terminal device at the same time.

In the above scenario, if the network side device 32 configures DC for the SIM card 1 of the terminal device, because the DC needs to occupy two downlink receiving channels (a primary base station of the DC occupies one downlink receiving channel, and a secondary base station of the DC occupies one downlink receiving channel), two downlink receiving channels are both occupied by SIM card 1, and SIM card 2 has no downlink receiving channel available. Therefore, paging reception of SIM card 2 is affected.

Based on the above problems and the wireless communication method provided by the embodiments of the present invention, the terminal device 31 sends, to the network side device 32, the indication information used to indicate that the terminal device 31 does not expect a dual connectivity DC configuration, and after the network side device 32 receives the indication information sent by the terminal device, when the condition for configuring DC for the terminal device 31 in the case where the indication information is not received is satisfied, the network side device 32 does not configure DC for the terminal device 31. Therefore, the wireless communication method provided by the embodiment of the present invention can avoid affecting paging reception of SIM card 2 to some extent.

Optionally, step S21 (sending indication information to the at least one target network side device) includes:
- sending the indication information to a network side device corresponding to any SIM card; where
- the network side device corresponding to any SIM card is a network side device that has established an RRC connection with the SIM card or a network side device that is establishing or resuming an RRC connection with the SIM card.

That is, the terminal device sends indication information to each network side device that has established an RRC connection or is establishing or resuming an RRC connection with the terminal device.

For example, in the embodiment shown in FIG. 3, the network side device that has established an RRC connection or is establishing or resuming an RRC connection with the terminal device 31 includes the network side device 32. Therefore, the terminal device sends indication information to the network side device 32.

Embodiment 2

Figure 4:
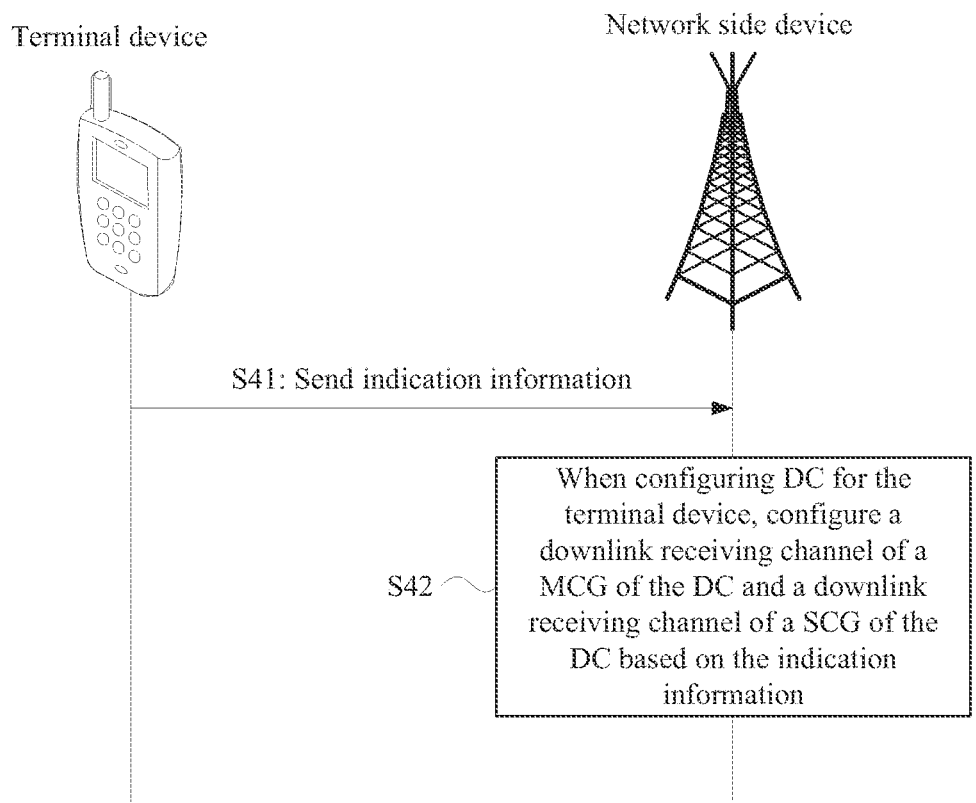
FIG. 4 is a second flowchart of interaction of a wireless communication method according to an embodiment of this application.

The embodiments of the present application provide a wireless communication method, and FIG. 4 is a flowchart of interaction of the wireless communication method according to the embodiments of this application. As shown in FIG. 4, the wireless communication method may include:
S41: A terminal device sends indication information to at least one target network side device.

Correspondingly, the at least one target network side device receives the indication information sent by the terminal device.

The target network side device is a network side device that has established a radio resource control RRC connection with the terminal device or a network side device that is establishing or resuming an RRC connection with the terminal device; the indication information is used to indicate a target downlink receiving channel set, or a target downlink receiving carrier set, or a time division multiplexing TDM pattern of each downlink receiving channel of target downlink receiving channels, or a time-division multiplexing TDM pattern of each downlink receiving carrier in the target downlink receiving carrier set; the target downlink receiving channel set is a set formed by a downlink receiving channel with downlink reception; and the target downlink receiving carrier set is a set formed by a downlink receiving carrier with downlink receiving.

That is, the sending the indication information to the at least one target network side device in step S41 includes the following implementations:

Implementation a:

The terminal device sends, to the network side device that has established an RRC connection with the terminal device, a set formed by downlink receiving channels with downlink reception.

Implementation b:

The terminal device sends, to the network side device that is establishing an RRC connection with the terminal device, a set formed by downlink receiving channels with downlink reception.

Implementation c:

The terminal device sends, to the network side device that is resuming an RRC connection with the terminal device, a set formed by downlink receiving channels with downlink reception.

Implementation d:

The terminal device sends, to the network side device that has established an RRC connection with the terminal device, a time-division multiplexing (TDM) pattern of each downlink receiving channel with downlink reception.

Implementation e:

The terminal device sends, to the network side device that is establishing an RRC connection with the terminal device, a TDM pattern of each downlink receiving channel with downlink reception.

Implementation f:

The terminal device sends, to the network side device that is resuming an RRC connection with the terminal device, a TDM pattern of each downlink receiving channel with downlink reception.

Implementation g:

The terminal device sends, to the network side device that has established an RRC connection with the terminal device, a set formed by downlink receiving carriers with downlink reception.

Implementation h:

The terminal device sends, to the network side device that is establishing an RRC connection with the terminal device, a set formed by downlink receiving carriers with downlink reception.

Implementation i:

The terminal device sends, to the network side device that is resuming an RRC connection with the terminal device, a set formed by downlink receiving carriers with downlink reception.

Implementation j:

The terminal device sends, to the network side device that has established an RRC connection with the terminal device, a TDM pattern of each downlink receiving carrier with downlink reception.

Implementation l:

The terminal device sends, to the network side device that is establishing an RRC connection with the terminal device, a TDM pattern of each downlink receiving carrier with downlink reception.

Implementation m:

The terminal device sends, to the network side device that is resuming an RRC connection with the terminal device, a TDM pattern of each downlink receiving carrier with downlink reception.

In addition, it should be noted that in step S41, the sending indication information to the at least one target network side device can include any one of implementations a to m, or can include two or more of implementations a to m, which is not limited in the embodiments of the present invention.

It should be noted that any number of downlink sending channels, for example, 1 or 2, can be included in the target downlink send channel set. Similarly, any number of downlink sending carriers, for example, 1 or 2, can be included in the target downlink sending carrier set.

After step S41, the network side device that receives the indication information sent by the terminal device further performs the following step S42.

S42: When configuring dual connectivity DC for the terminal device, the network side device configures a downlink receiving channel of an MCG of the DC and a downlink receiving channel of an SCG of the DC based on the indication information.

In the wireless communication method provided by the embodiments of the present invention, the terminal device sends indication information to at least one target network side device; where the target network side device is a network side device that has established a radio resource control RRC connection with the terminal device or a network side device that is establishing or resuming an RRC connection with the terminal device; the indication information is used to indicate a target downlink receiving channel set, or a target downlink receiving carrier set, or a time division multiplexing TDM pattern of each downlink receiving channel of target downlink receiving channels, or a time-division multiplexing TDM pattern of each downlink receiving carrier in the target downlink receiving carrier set; the target downlink receiving channel set is a set formed by a downlink receiving channel with downlink reception; and the target downlink receiving carrier set is a set formed by a downlink receiving carrier with downlink receiving. That is, the terminal device indicates, to the network side that has established an RRC connection or is establishing or resuming an RRC connection, a downlink receiving channel with downlink reception, or a downlink reception carrier with downlink reception, or a TDM pattern of a downlink receiving channel with downlink reception, or a TDM pattern of a downlink receiving carrier with downlink reception. Therefore, when the network side device that receives the indication information configures DC for the terminal device, the network side device can configure MCG and SCG downlink receiving channels based on the indication information, to avoid affecting other downlink reception when configuring DC for the terminal device.

Figure 5:
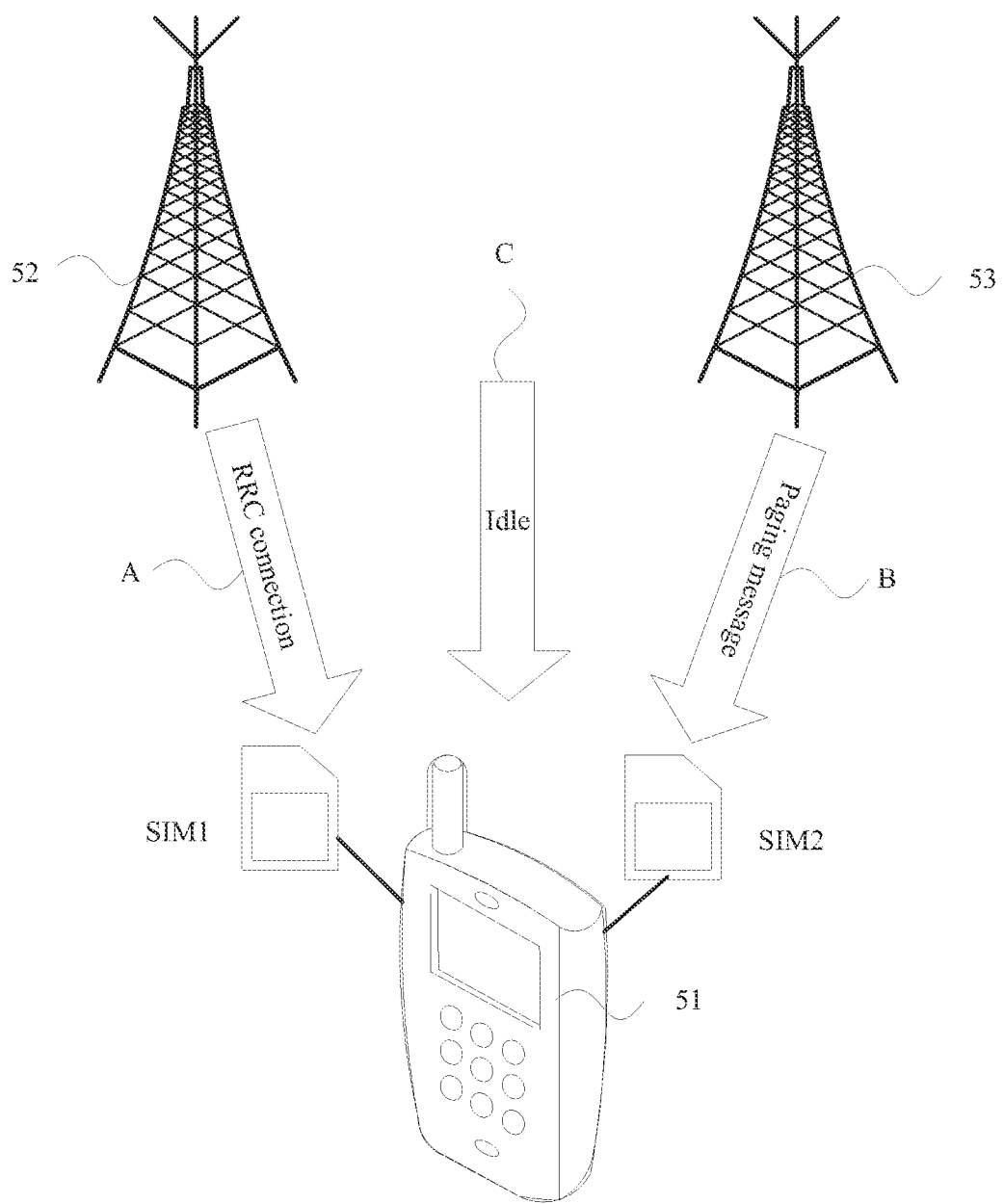
FIG. 5 is a second schematic diagram of an application scenario of a wireless communication method according to an embodiment of the application.

The following uses an example in which the terminal device includes three downlink receiving channels and are installed with two SIM cards, where one SIM card is in a connection state and the other SIM card is in an idle state, to exemplarily describe the wireless communication solution provided in the above embodiment. As shown in FIG. 5, SIM card 1 of a terminal device 51 establishes an RRC connection with a network side device 52, and the RRC connection occupies downlink receiving channel A of the terminal device. SIM card 2 of the terminal device 51 is in an idle state and receives a paging message sent by a network side device 53. The paging message sent by the network side device 53 to SIM card 2 occupies downlink reception channel B of the terminal device. The downlink receiving channel C of the terminal device is not occupied and is in an idle state. An implementation solution for configuring a downlink receiving channel of an MCG of the DC and a downlink receiving channel of a SCG of the DC based on the indication information in step S42 may be any one of the following solution a to solution e.

Solution a:

The network side device configures a downlink receiving channel of the MCG as a first downlink receiving channel, and configures a downlink receiving channel of the SCG as a second downlink receiving channel, where the first downlink receiving channel is a downlink receiving channel occupied by an RRC connection between the network side device and the terminal device, and the second downlink receiving channel does not belong to the target downlink receiving channel set or the second downlink receiving channel is not a downlink receiving channel corresponding to a carrier in the target downlink receiving carrier set.

In the above solution a, because the network side device configures the downlink receiving channel of the MCG as the downlink receiving channel occupied by the RRC connection between the network side device and the terminal device, and configures the downlink receiving channel of the SCG as the downlink channel without downlink reception, or the downlink receiving channel corresponding to the downlink receiving carrier without downlink reception. Therefore, in the above solution a, other downlink reception is not affected when DC is configured.

In an example shown in FIG. 5, the network side device that configures the downlink receiving channel of the MCG and the downlink receiving channel of the SCG is a network side device 52. A downlink receiving channel occupied by an RRC connection between the network side device 52 and the terminal device 51 is downlink receiving channel A. The downlink receiving channel with downlink reception includes: downlink receiving channel A and downlink receiving channel B. Therefore, the target downlink receiving channel set includes: downlink receiving channel A and downlink receiving channel B. The downlink receiving channel that does not belong to the target downlink receiving channel set only includes downlink receiving channel C. Therefore, the configuring the downlink receiving channel of the MCG as the first downlink receiving channel, and configuring the downlink receiving channel of the SCG as the second downlink receiving channel may be: configuring the downlink receiving channel of the MCG as downlink receiving channel A, and configuring the downlink receiving channel of the SCG as downlink receiving channel C.

Solution b:

The network side device configures a downlink receiving channel of the SCG as a first downlink receiving channel, and configures a downlink receiving channel of the MCG as a second downlink receiving channel, where the first downlink receiving channel is a downlink receiving channel occupied by an RRC connection between the network side device and the terminal device, and the second downlink receiving channel does not belong to the target downlink receiving channel set or the second downlink receiving channel is not a downlink receiving channel corresponding to a carrier of target downlink receiving carriers.

In the above solution b, because the network side device configures the downlink receiving channel of the SCG as the downlink receiving channel occupied by the RRC connection between the network side device and the terminal device, and configures the downlink receiving channel of the MCG as the downlink channel without downlink reception, or the downlink receiving channel corresponding to the downlink receiving carrier without downlink reception. Therefore, in the above solution b, other downlink reception is not affected when DC is configured.

In the example shown in FIG. 5, the configuring the downlink receiving channel of the SCG as the first downlink receiving channel, and configuring the downlink receiving channel of the MCG as the second downlink receiving channel may be: configuring the downlink receiving channel of the SCG as downlink receiving channel A, and configuring the downlink receiving channel of the MCG as downlink receiving channel C.

Solution c:

The network side device configures the downlink receiving channel of the MCG as a first downlink receiving channel, configures the downlink receiving channel of the SCG as a third downlink receiving channel, and configures a downlink sending TDM pattern of the SCG as a first TDM pattern, where the third downlink receiving channel belongs to the target downlink receiving channel set or the third downlink receiving channel is a downlink receiving channel corresponding to a carrier of target downlink receiving carriers.

In solution c, the network side device configures the downlink receiving channel of the MCG as the downlink receiving channel occupied by the RRC connection between the network side device and the terminal device. Although the downlink receiving channel of the SCG is configured as the downlink channel with downlink reception or the downlink channel corresponding to the downlink receiving carrier with downlink reception, by configuring the TDM pattern, the downlink reception of the SCG and the original downlink reception on the third downlink receiving channel do not overlap in time domain. Therefore, in the above solution c, other downlink reception is not affected when DC is configured.

In the example shown in FIG. 5, the target downlink receiving channel set includes: downlink receiving channel A and downlink receiving channel B, and the downlink receiving channel A is the first downlink receiving channel in the solution c. Therefore, the downlink receiving channel C is the third downlink receiving channel in the solution c, and the second TDM pattern is a TDM pattern for SIM card 2 to perform paging reception on the downlink receiving channel B. The configuring the downlink receiving channel of the MCG as the first downlink receiving channel, configuring the downlink receiving channel of the SCG as the third downlink receiving channel, and configuring a downlink sending TDM pattern of the SCG as a first TDM pattern may be: configuring the downlink receiving channel of the MCG as downlink receiving channel A, configuring the downlink receiving channel of the SCG as downlink receiving channel B, and configuring the downlink sending TDM pattern of the SCG as the first TDM pattern.

Optionally, on the basis of the foregoing solution c, the wireless communication method provided by the embodiments of the present invention further includes:

sending first configuration information to the terminal device.

The first configuration information is used to configure the downlink sending TDM pattern of the SCG as the first TDM pattern.

That is, the network side device further instructs the terminal device to receive, according to the first TDM pattern, downlink information sent by the SCG.

Solution d:

The network side device configures a downlink receiving channel of the SCG as a first downlink receiving channel, configures a downlink receiving channel of the MCG as a third downlink receiving channel, and configures a downlink sending TDM pattern of the MCG as a third TDM pattern, where the third TDM pattern and a second TDM pattern have no intersection set, the second TDM pattern is a downlink receiving TDM pattern of the third downlink receiving channel indicated by the indication information, the first downlink receiving channel is a downlink receiving channel occupied by an RRC connection between the network side device and the terminal device, and the third downlink receiving channel belongs to the target downlink receiving channel set or the third downlink receiving channel is a downlink receiving channel corresponding to a carrier of target downlink receiving carriers;

In solution d, the network side device configures the downlink receiving channel of the SCG as the downlink receiving channel occupied by the RRC connection between the network side device and the terminal device. Although the downlink receiving channel of the MCG is configured as the downlink channel with downlink reception or the downlink channel corresponding to the downlink receiving carrier with downlink reception, by configuring the TDM pattern, the downlink reception of the MCG and the original downlink reception on the third downlink receiving channel do not overlap in time domain. Therefore, in the above solution d, other downlink reception is not affected when DC is configured.

In the example shown in FIG. 5, the configuring the downlink receiving channel of the SCG as the first downlink receiving channel, configuring the downlink receiving channel of the MCG as the third downlink receiving channel, and configuring a downlink sending TDM pattern of the MCG as a third TDM pattern may be: configuring the downlink receiving channel of the SCG as downlink receiving channel A, configuring the downlink receiving channel of the MCG as downlink receiving channel B, and configuring the downlink sending TDM pattern of the MCG as the third TDM pattern.

Optionally, on the basis of the foregoing solution d, the wireless communication method provided by the embodiments of the present invention further includes:

sending second configuration information to the terminal device.

The second configuration information is used to configure the downlink sending TDM pattern of the MCG as the third TDM pattern.

That is, the network side device further instructs the terminal device to receive, according to the second TDM pattern, downlink information sent by the MCG.

Solution f:

The network side device configures both a downlink receiving channel of the MCG and a downlink receiving channel of the SCG as a first downlink receiving channel, configures a downlink sending TDM pattern of the MCG as a fourth TDM pattern, and configures a downlink sending TDM pattern of the SCG as a fifth TDM pattern, where the first downlink receiving channel is a downlink receiving channel occupied by an RRC connection between the network side device and the terminal device, and the fourth TDM pattern and the fifth TDM pattern have no intersection set.

In solution f, first, both the downlink receiving channel of the MCG and the downlink receiving channel of the SCG are configured as the first downlink receiving channel. Therefore, downlink reception is not affected when DC is configured. Then, the downlink sending TDM pattern of the MCG is configured as the fourth TDM pattern, and the downlink sending TDM pattern of the SCG is configured as the fifth TDM pattern, where the fourth TDM pattern and the fifth TDM pattern have no intersection set. Therefore, downlink reception of the MCG and downlink reception of the SCG do not affect each other.

In the example shown in FIG. 5, the configuring both the downlink receiving channel of the MCG and the downlink receiving channel of the SCG as the first downlink receiving channel, configuring the downlink sending TDM pattern of the MCG as the fourth TDM pattern, and configuring the downlink sending TDM pattern of the SCG as the fifth TDM pattern may be: configuring both the downlink receiving channel of the MCG and the downlink receiving channel of the SCG as downlink receiving channel A, configuring the downlink sending TDM pattern of the MCG as the fourth TDM pattern, and configuring the downlink sending TDM pattern of the SCG as the fifth TDM pattern.

Optionally, on the basis of the foregoing solution f, the wireless communication method provided by the embodiments of the present invention further includes:

sending third configuration information to the terminal device.

The third configuration information is used to configure the downlink sending TDM pattern of the MCG as the fourth TDM pattern and configure the downlink sending TDM pattern of the SCG as the fifth TDM pattern.

That is, the network side device further instructs the terminal device to receive, according to the fourth TDM pattern, downlink information sent by the MCG, and receive, according to the fifth TDM pattern, downlink information sent by the SCG.

Embodiment 3

Figure 6:
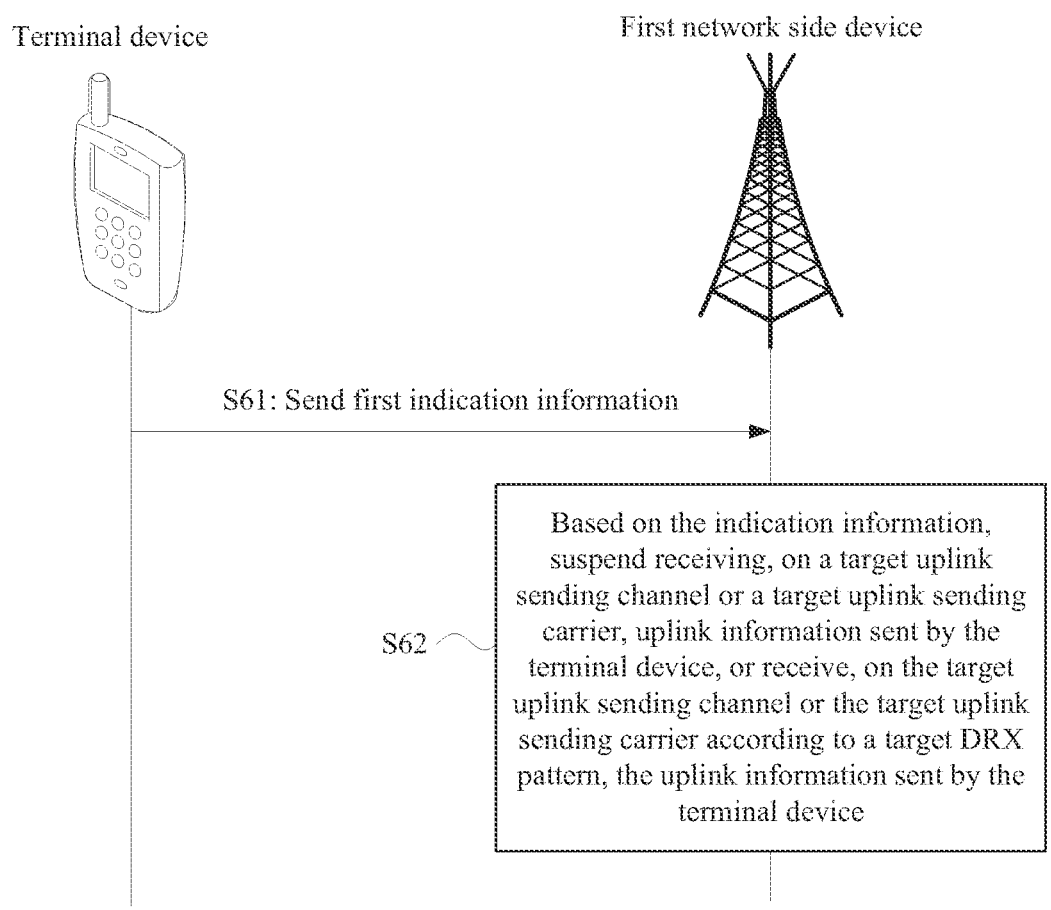
FIG. 6 is a third flowchart of interaction of a wireless communication method according to an embodiment of this application.

The embodiments of the present application provide a wireless communication method, and FIG. 6 is a flowchart of interaction of the wireless communication method according to the embodiments of this application. As shown in FIG. 6, the wireless communication method may include:

S61: When a preset condition is satisfied, the terminal device sends first indication information to a first network side device.

Correspondingly, the first network side device receives the first indication information sent by the terminal device.

The first network side device is a master base station MeNB and/or a secondary base station SeNB that establishes dual connectivity DC with a first subscriber identity module SIM card of the terminal device; the first indication information is used to instruct the first network side device to suspend receiving, on a target uplink sending channel or a target uplink sending carrier, uplink information sent by the first SIM card, or the first indication information is used to instruct the first network side device to receive, on a target uplink sending channel or a target uplink sending carrier, a discontinuous reception (DRX) pattern of uplink information sent by the terminal device; the target uplink sending channel is an uplink sending channel used by the first SIM card to send the uplink information to the MeNB and/or an uplink sending channel used by the first SIM card to send the uplink information to the SeNB; and the target uplink sending carrier is an uplink sending carrier used by the first SIM card to send the uplink information to the MeNB and/or an uplink sending carrier used by the first SIM card to send the uplink information to the SeNB.

It should be noted that, in the embodiments of the present invention, the preset condition (a trigger condition for triggering the terminal device to send first indication information to the first network side device) is not limited, as long as the terminal device can be triggered to send first indication information to the first network side device.

Optionally, the preset condition includes: a second subscriber identity module SIM card of the terminal device needs to establish or resume a radio resource control RRC connection with a second network side device, and needs to carry uplink sending of the second SIM card on the target uplink sending channel or the target uplink sending carrier.

S62: in the case where the indication information is used to instruct the network side device to suspend receiving, on a target uplink sending channel or a target uplink sending carrier, uplink information sent by the terminal device, the first network side device suspends receiving, on the target uplink sending channel or the target uplink sending carrier based on the indication information, the uplink information sent by the terminal device; or in the case where the indication information is used to instruct the network side device to receive, on a target uplink sending channel or a target uplink sending carrier according to a target discontinuous reception DRX pattern, the uplink information sent by the terminal device, receives, on the target uplink sending channel or the target uplink sending carrier according to the target DRX pattern, the uplink information sent by the terminal device.

In the wireless communication method provided by the embodiments of the present invention, the terminal device sends the first indication information to the first network side device when the preset condition is met, where the first network side device is a MeNB and/or a SeNB that have established DC with a first subscriber identity module SIM card of the terminal device; the first indication information is used to instruct the first network side device to suspend receiving, on a target uplink sending channel or a target uplink sending carrier, uplink information sent by the first SIM card, or instruct the first network side device to receive, on a target uplink sending channel or a target uplink sending carrier, a DRX pattern of uplink information sent by the terminal device; the target uplink sending channel is an uplink sending channel used by the first SIM card to send the uplink information to the MeNB and/or an uplink sending channel used by the first SIM card to send the uplink information to the SeNB; and the target uplink sending carrier is an uplink sending carrier used by the first SIM card to send the uplink information to the MeNB and/or an uplink sending carrier used by the first SIM card to send the uplink information to the SeNB. That is, in the case where the terminal device needs to send other uplink information by using the uplink sending channel or carrier used to send uplink information to MeNB and/or the uplink sending channel or carrier used by the first SIM card to send uplink information to the SeNB, the MeNB and/or SeNB is notified to suspend receiving, on the target uplink sending channel or carrier, the uplink information sent by the first SIM card, or receive, on the target uplink sending channel or carrier, the discontinuous reception DRX pattern of the uplink information sent by the terminal device. Therefore, uplink sending of MeNB and/or SeNB and other uplink sending do not affect each other.

In some embodiments, step S61 (the terminal device sends the first indication information to the first network side device) may include any one of the following solutions I to V.

Solution I:

The first network side device is the MeNB, the target uplink sending channel is an uplink sending channel or an uplink sending carrier used by the first SIM card to send the uplink information to the MeNB, the first indication information is used to instruct the MeNB to suspend receiving, on the target uplink sending channel or the target uplink sending carrier, the uplink information sent by the first SIM card;

Since the first indication information instructs the MeNB to suspend receiving, on the target uplink sending channel or the target uplink sending carrier, the uplink information sent by the first SIM card, the terminal device can configure the uplink sending channel or uplink sending carrier originally for sending uplink information to the MeNB as the uplink sending channel or uplink sending carrier for sending the uplink information to the second network side device.

Figure 7:
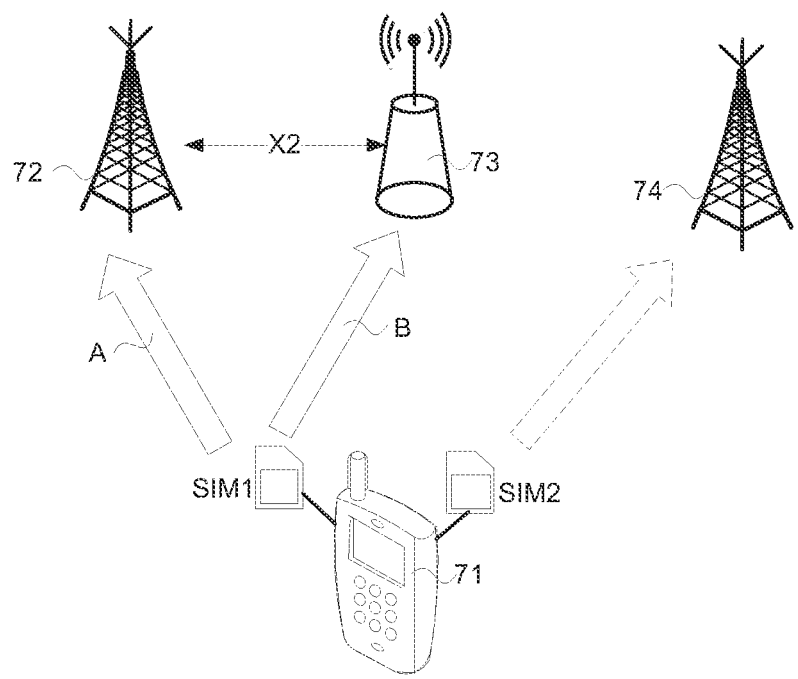
FIG. 7 is a third schematic diagram of an application scenario of a wireless communication method according to an embodiment of the application.

The following uses an example in which the terminal device supports dual uplink sending and are installed with two SIM cards, where SIM card 1 is configured with DC and SIM card 2 needs to establish an RRC connection with the second network side device, to exemplarily describe the wireless communication solution provided in the above embodiment. As shown in FIG. 7, the SIM card 1 of the terminal device 71 is configured with DC, the MeNB 72 of the DC occupies the uplink sending channel A of the terminal device, and the MeNB 73 of the DC occupies the uplink sending channel B of the terminal device. The SIM card 2 of the terminal device 71 needs to switch from the idle state to the connection state; that is, the SIM card 2 of the terminal device 71 needs to establish an RRC connection with the network side device 74. Therefore, the SIM card 2 needs to use an uplink send capability. Then, the terminal device 71 sends, to the MeNB 72, the first indication information used to instruct the MeNB to suspend receiving, on the uplink sending channel A, the uplink information sent by the SIM card 1.

Solution II:

The first network side device is the SeNB, the target uplink sending channel is an uplink sending channel or an uplink sending carrier used by the first SIM card to send the uplink information to the SeNB, the first indication information is used to instruct the SeNB to suspend receiving, on the target uplink sending channel or the target uplink sending carrier, the uplink information sent by the first SIM card.

Since the first indication information instructs the SeNB to suspend receiving, on the target uplink sending channel or the target uplink sending carrier, the uplink information sent by the first SIM card, the terminal device can configure the uplink sending channel or uplink sending carrier originally for sending uplink information to the SeNB as the uplink sending channel or uplink sending carrier for sending the uplink information to the second network side device.

In the example shown in FIG. 7, solution II is: the terminal device 71 may send, to the SeNB 73, the first indication information used to indicate the SeNB 73 to suspend receiving, on the uplink sending channel B, the uplink information sent by the SIM card 1.

Solution III:

The first network side device is the MeNB, the target uplink sending channel is an uplink sending channel or an uplink sending carrier used by the first SIM card to send the uplink information to the MeNB, the first indication information is used to instruct the MeNB to receive, on the target uplink sending channel or the target uplink sending carrier according to the first DRX pattern, the uplink information sent by the first SIM card.

That is, the terminal device configures that MeNB and the second network side device share, through different DRX patterns, the uplink sending channel or uplink sending carrier originally for sending the uplink information to the MeNB.

In the example shown in FIG. 7, solution III is: the terminal device 71 may send, to the MeNB 72, the first indication information used to indicate the MeNB 72 to receive, on the target uplink sending channel according to the first DRX pattern, the uplink information sent by the SIM card 1.

Optionally, on the basis of the foregoing embodiment, the wireless communication method provided by the embodiments of the present invention further includes:

sending, by the terminal device, second indication information to the second network side device.

Correspondingly, the second network side device receives the second indication information sent by the terminal device.

The indication information is used to instruct the second network side device to receive, on a target uplink sending channel or a target uplink sending carrier according to a fifth DRX pattern, the uplink information sent by the terminal device.

The second network side device receives, on the target uplink sending channel or the target uplink sending carrier according to the fifth DRX pattern, the uplink information sent by the terminal device.

The fifth DRX pattern and the first DRX pattern have no intersection.

Solution IV:

The first network side device is the SeNB, the target uplink sending channel is an uplink sending channel or an uplink sending carrier used by the first SIM card to send the uplink information to the SeNB, the first indication information is used to instruct the SeNB to receive, on the target uplink sending channel or the target uplink sending carrier according to the second DRX pattern, the uplink information sent by the first SIM card.

That is, the terminal device configures that SeNB and the second network side device share, through different DRX patterns, the uplink sending channel or uplink sending carrier originally for sending the uplink information to the SeNB.

In the example shown in FIG. 7, solution IV is: the terminal device 71 may send, to the SeNB 73, the first indication information used to indicate the SeNB 73 to receive, on the target uplink sending channel according to the second DRX pattern, the uplink information sent by the SIM card 1.

Optionally, on the basis of the foregoing embodiment, the wireless communication method provided by the embodiments of the present invention further includes:

sending, by the terminal device, third indication information to the second network side device.

Correspondingly, the second network side device receives the third indication information sent by the terminal device.

The indication information is used to instruct the second network side device to receive, on a target uplink sending channel or a target uplink sending carrier according to a sixth DRX pattern, the uplink information sent by the terminal device.

The second network side device receives, on the target uplink sending channel or the target uplink sending carrier according to the sixth DRX pattern, the uplink information sent by the terminal device.

The sixth DRX pattern and the second DRX pattern have no intersection.

Solution V: the first network side device includes: the MeNB and the SeNB, the target uplink sending channel is an uplink sending channel or an uplink sending carrier used by the first SIM card to send the uplink information to the MeNB and the SeNB, and the first indication information is used to instruct the MeNB to receive, on the target uplink sending channel or the target uplink sending carrier according to a third DRX pattern, the uplink information sent by the first SIM card, and the first indication information is used to instruct the SeNB to receive, on the target uplink sending channel or the target uplink sending carrier according to a fourth DRX pattern, the uplink information sent by the first SIM card.

When uplink sending channels used to send uplink information to the MeNB and the SeNB are the same uplink sending channel or uplink sending carrier, the terminal device configures that MeNB, SeNB, and the second network side device share, through different DRX patterns, the uplink sending channel or uplink sending carrier originally for sending the uplink information to the MeNB and SeNB.

Figure 8:
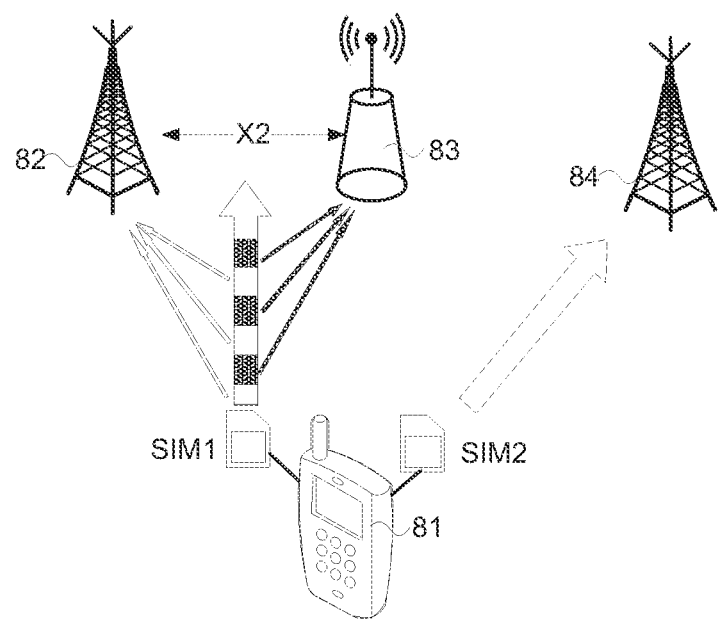
FIG. 8 is a fourth schematic diagram of an application scenario of a wireless communication method according to an embodiment of the application.

The following uses an example in which the terminal device supports single uplink sending and are installed with two SIM cards, where SIM card 1 is configured with DC and SIM card 2 needs to establish an RRC connection with the second network side device, to exemplarily describe the wireless communication solution provided in the above embodiment. As shown in FIG. 8, the SIM card 1 of the terminal device 81 is configured with DC, the uplink sending channel of the terminal device is shared to send uplink information to the MeNB 82 and SeNB 83 of the DC. The SIM card 2 of the terminal device 81 needs to switch from the idle state to the connection state; that is, the SIM card 2 of the terminal device 81 needs to establish an RRC connection with the network side device 84. Therefore, the SIM card 2 needs to use an uplink send capability. Then, the terminal device sends the first indication information to the MeNB 82 and SeNB 83 of the DC. The first indication information is used to instruct the MeNB 82 to receive, on the target uplink sending channel according to the third DRX pattern, the uplink information sent by the SIM card 1, and the first indication information is used to instruct the SeNB 83 to receive, on the target uplink sending channel according to the fourth DRX pattern, the uplink information sent by the SIM card 1.

Optionally, on the basis of the foregoing embodiment, the wireless communication method provided by the embodiments of the present invention further includes:

sending, by the terminal device, fourth indication information to the second network side device.

Correspondingly, the second network side device receives the fourth indication information sent by the terminal device.

The indication information is used to instruct the second network side device to receive, on a target uplink sending channel according to a seventh DRX pattern, the uplink information sent by the terminal device.

The seventh DRX pattern and the third DRX pattern have no intersection set and the seventh DRX pattern and the fourth DRX pattern have no intersection set.

Embodiment 4

In some embodiments of the present invention, the terminal device may be divided into functional modules according to the foregoing method examples. For example, functional modules can be divided corresponding to each function, or two or more functions can be integrated into one module. The integrated modules can be implemented in the form of hardware or software function modules. It should be noted that the division of modules in some embodiments of the present invention is illustrative, and is only a logical function division, and there may be other division methods in actual implementation.

Figure 9:
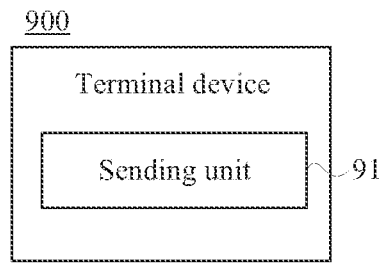
FIG. 9 is a schematic structural diagram of a terminal device according to an embodiment of this application.

When an integrated unit is used, FIG. 9 is a possible schematic structural diagram of a terminal device according to the foregoing embodiment. The terminal device 900 includes:

a sending unit 91, configured to: when a preset condition is satisfied, send indication information to at least one target network side device;

where the target network side device is a network side device that has established a radio resource control RRC connection with the terminal device or a network side device that is establishing or resuming an RRC connection with the terminal device, and the indication information is used to indicate that the terminal device does not expect to receive a dual connectivity DC configuration, and/or the indication information is used to indicate a carrier that the terminal device does not expect to configure.

Optionally, the sending unit 91 is configured to send the indication information to a network side device corresponding to any SIM card; where the network side device corresponding to any SIM card is a network side device that has established an RRC connection with the SIM card or a network side device that is establishing or resuming an RRC connection with the SIM card.

Optionally, the sending unit is configured to: in a case where at least one SIM card of the terminal device has established an RRC connection with the network side device or is establishing or resuming an RRC connection with the network side device, and the at least one SIM card of the terminal device is in an idle state, send the indication information to the at least one target network side device.

In the embodiments of the present invention, the terminal device sends indication information to the at least one target network side device; where the target network side device is a network side device that has established an RRC connection with the terminal device or a network side device that is establishing or resuming an RRC connection with the terminal device, and the indication information is used to indicate that the terminal device does not expect to receive a dual connectivity DC configuration, or the indication information is used to indicate a carrier that the terminal device does not expect to configure. The terminal device indicates, to the network side device that has established an RRC connection or a network side device that is establishing or resuming an RRC connection with the terminal device, that the terminal device does not expect to receive a DC configuration or the carrier that the terminal device does not expect to configure. Therefore, after receiving the indication information, the network side device can avoid configuring DC for the terminal device or configuring the carrier indicated by the identifier for the terminal device in some cases. Therefore, the embodiments of the present invention can prevent the wireless communication system from configuring DC or the carrier indicated by the identifier for the terminal device, to solve the problem that when a network side device configures DC or configures some carriers for one of multiple SIM cards installed in the terminal device, signal transmission of another SIM card of the terminal device may be affected.

Alternatively, the terminal device 900 includes:

a sending unit 91, configured to send indication information to at least one target network side device;

where the target network side device is a network side device that has established a radio resource control RRC connection with the terminal device or a network side device that is establishing or resuming an RRC connection with the terminal device; the indication information is used to indicate a target downlink receiving channel set, or a target downlink receiving carrier set, or a time division multiplexing TDM pattern of each downlink receiving channel of target downlink receiving channels, or a time-division multiplexing TDM pattern of each downlink receiving carrier in the target downlink receiving carrier set; the target downlink receiving channel set is a set formed by a downlink receiving channel with downlink reception; and the target downlink receiving carrier set is a set formed by a downlink receiving carrier with downlink receiving.

In the embodiments of the present invention, the terminal device sends indication information to at least one target network side device; where the target network side device is a network side device that has established a radio resource control RRC connection with the terminal device or a network side device that is establishing or resuming an RRC connection with the terminal device; the indication information is used to indicate a target downlink receiving channel set, or a target downlink receiving carrier set, or a time division multiplexing TDM pattern of each downlink receiving channel of target downlink receiving channels, or a time-division multiplexing TDM pattern of each downlink receiving carrier in the target downlink receiving carrier set; the target downlink receiving channel set is a set formed by a downlink receiving channel with downlink reception; and the target downlink receiving carrier set is a set formed by a downlink receiving carrier with downlink receiving. That is, the terminal device indicates, to the network side that has established an RRC connection or is establishing or resuming an RRC connection, a downlink receiving channel with downlink reception, or a downlink reception carrier with downlink reception, or a TDM pattern of a downlink receiving channel with downlink reception, or a TDM pattern of a downlink receiving carrier with downlink reception. Therefore, when the network side device that receives the indication information configures DC for the terminal device, the network side device can configure MCG and SCG downlink receiving channels based on the indication information, to avoid affecting other downlink reception when configuring DC for the terminal device.

Alternatively, the terminal device 900 includes:

a sending unit 91, configured to: when a preset condition is satisfied, send first indication information to a first network side device;

where the first network side device is a master base station MeNB and/or a secondary base station SeNB that establishes dual connectivity DC with a first subscriber identity module SIM card of the terminal device; the first indication information is used to instruct the first network side device to suspend receiving, on a target uplink sending channel or a target uplink sending carrier, uplink information sent by the first SIM card, or instruct the first network side device to receive, on a target uplink sending channel or a target uplink sending carrier, a discontinuous reception DRX pattern of uplink information sent by the terminal device; the target uplink sending channel is an uplink sending channel used by the first SIM card to send the uplink information to the MeNB and/or an uplink sending channel used by the first SIM card to send the uplink information to the SeNB; and the target uplink sending carrier is an uplink sending carrier used by the first SIM card to send the uplink information to the MeNB and/or an uplink sending carrier used by the first SIM card to send the uplink information to the SeNB.

Optionally, the first network side device is the MeNB, the target uplink sending channel is an uplink sending channel or an uplink sending carrier used by the first SIM card to send the uplink information to the MeNB, the first indication information is used to instruct the MeNB to suspend receiving, on the target uplink sending channel or the target uplink sending carrier, the uplink information sent by the first SIM card;

or;

the first network side device is the SeNB, the target uplink sending channel is an uplink sending channel or an uplink sending carrier used by the first SIM card to send the uplink information to the SeNB, the first indication information instructs the SeNB to suspend receiving, on the target uplink sending channel or the target uplink sending carrier, the uplink information sent by the first SIM card;

or;

the first network side device is the MeNB, the target uplink sending channel is an uplink sending channel or an uplink sending carrier used by the first SIM card to send the uplink information to the MeNB, the first indication information is used to instruct the MeNB to receive, on the target uplink sending channel or the target uplink sending carrier according to the first DRX pattern, the uplink information sent by the first SIM card;

or the first network side device is the SeNB, the target uplink sending channel is an uplink sending channel or an uplink sending carrier used by the first SIM card to send the uplink information to the SeNB, the first indication information is used to instruct the SeNB to receive, on the target uplink sending channel or the target uplink sending carrier according to the second DRX pattern, the uplink information sent by the first SIM card;

or;

the first network side device includes: the MeNB and the SeNB, the target uplink sending channel is an uplink sending channel or an uplink sending carrier used by the first SIM card to send the uplink information to the MeNB and the SeNB, and the first indication information is used to instruct the MeNB to receive, on the target uplink sending channel or the target uplink sending carrier according to a third DRX pattern, the uplink information sent by the first SIM card, and instruct the SeNB to receive, on the target uplink sending channel or the target uplink sending carrier according to a fourth DRX pattern, the uplink information sent by the first SIM card.

Optionally, the preset condition includes: a second subscriber identity module SIM card of the terminal device needs to establish or resume a radio resource control RRC connection with a second network side device, and needs to carry uplink sending of the second SIM card on the target uplink sending channel or the target uplink sending carrier.

Optionally, the sending unit 91 is further configured to: in the case where the first network side device is the MeNB, the target uplink sending channel is an uplink sending channel or an uplink sending carrier used by the first SIM card to send the uplink information to the MeNB, and the first indication information is used to instruct the MeNB to receive, on the target uplink sending channel or the target uplink sending carrier according to the first DRX pattern, the uplink information sent by the first SIM card, send second indication information to the second network side device, where the second indication information is used to instruct the second network side device to receive, on the target uplink sending channel or the target uplink sending carrier according to a fifth DRX pattern, the uplink information sent by the second SIM card, where the fifth DRX pattern and the first DRX pattern have no intersection set;

in the case where the first network side device is the SeNB, the target uplink sending channel is an uplink sending channel or an uplink sending carrier used by the first SIM card to send the uplink information to the SeNB, and the first indication information is used to instruct the SeNB to receive, on the target uplink sending channel or the target uplink sending carrier according to the second DRX pattern, the uplink information sent by the first SIM card, the sending unit 91 is further configured to: send third indication information to the second network side device, where the third indication information is used to instruct the second network side device to receive, on the target uplink sending channel or the target uplink sending carrier according to a sixth DRX pattern, the uplink information sent by the second SIM card, where the sixth DRX pattern and the second DRX pattern have no intersection set; and in the case where the first network side device includes: the MeNB and the SeNB, the target uplink sending channel is an uplink sending channel or an uplink sending carrier used by the first SIM card to send the uplink information to the MeNB and the SeNB, and the first indication information is used to instruct the MeNB to receive, on the target uplink sending channel or the target uplink sending carrier according to a third DRX pattern, the uplink information sent by the first SIM card, and instruct the SeNB to receive, on the target uplink sending channel or the target uplink sending carrier according to a fourth DRX pattern, the uplink information sent by the first SIM card, the sending unit 91 is further configured to: send fourth indication information to the second network side device, where the fourth indication information is used to instruct the second network side device to receive, on the target uplink sending channel or the target uplink sending carrier according to a seventh DRX pattern, the uplink information sent by the second SIM card, where the seventh DRX pattern and the DRX pattern have no intersection set and the seventh DRX pattern and the fourth DRX pattern have no intersection set.

In the embodiments of the present invention, the terminal device sends the first indication information to the first network side device when the preset condition is met, where the first network side device is a MeNB and/or a SeNB that have established DC with a first subscriber identity module SIM card of the terminal device; the first indication information is used to instruct the first network side device to suspend receiving, on a target uplink sending channel or a target uplink sending carrier, uplink information sent by the first SIM card, or instruct the first network side device to receive, on a target uplink sending channel or a target uplink sending carrier, a DRX pattern of uplink information sent by the terminal device; the target uplink sending channel is an uplink sending channel used by the first SIM card to send the uplink information to the MeNB and/or an uplink sending channel used by the first SIM card to send the uplink information to the SeNB; and the target uplink sending carrier is an uplink sending carrier used by the first SIM card to send the uplink information to the MeNB and/or an uplink sending carrier used by the first SIM card to send the uplink information to the SeNB. That is, when the terminal device needs to send other uplink information by using the uplink sending channel or carrier used to send uplink information to MeNB and/or the uplink sending channel or carrier used by the first SIM card to send uplink information to the SeNB, the MeNB and/or SeNB is notified to suspend receiving, on the target uplink sending channel or carrier, the uplink information sent by the first SIM card, or receiving, on the target uplink sending channel or carrier, the discontinuous reception DRX pattern of the uplink information sent by the terminal device. Therefore, uplink sending of MeNB and/or SeNB and other uplink sending do not affect each other.

Figure 10:
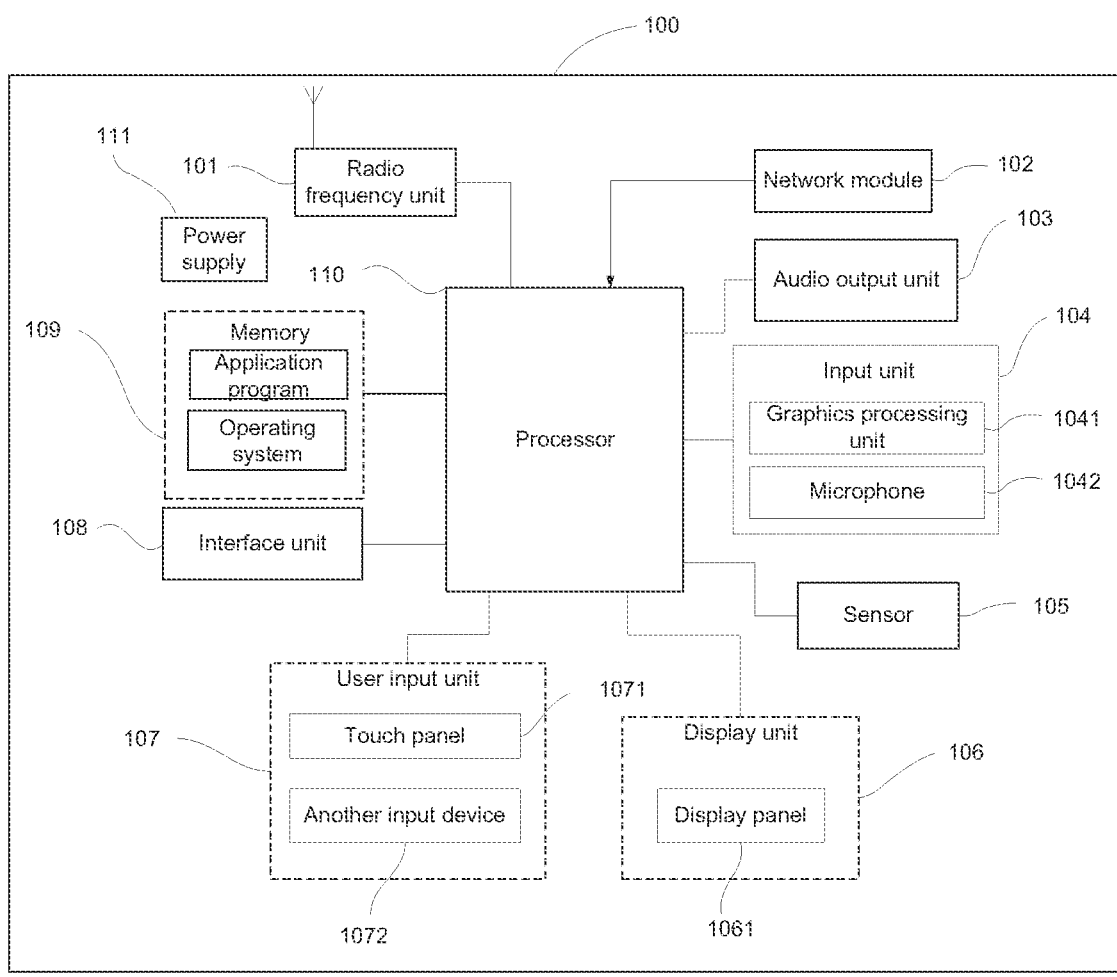
FIG. 10 is a schematic structural diagram of hardware of a terminal device according to an embodiment of this application.

FIG. 10 is a schematic structural diagram of hardware of a terminal device implementing the embodiments of this application. The terminal device 100 includes but is not limited to: a radio frequency unit 101, a network module 102, an audio output unit 103, an input unit 104, a sensor 105, a display unit 106, a user input unit 107, an interface unit 108, a memory 109, a processor 110, a power supply 111, and other components. A person skilled in the art may understand that the structure of the terminal device shown in FIG. 10 does not constitute a limitation to the terminal device. The terminal device may include more or fewer components than that shown in the figure, or a combination of some components, or an arrangement of different components. In this embodiment of this application, the terminal device includes but is not limited to a mobile phone, a tablet computer, a notebook computer, a palmtop computer, a vehicle-mounted terminal, a wearable device, a pedometer, or the like.

The radio frequency unit 101 is configured to: when a preset condition is satisfied, send indication information to at least one target network side device;

where the target network side device is a network side device that has established a radio resource control RRC connection with the terminal device or a network side device that is establishing or resuming an RRC connection with the terminal device, and the indication information is used to indicate that the terminal device does not expect to receive a dual connectivity DC configuration, and/or the indication information is used to indicate a carrier that the terminal device does not expect to configure.

Alternatively, the radio frequency unit 101 is configured to send indication information to at least one target network side device;

where the target network side device is a network side device that has established a radio resource control RRC connection with the terminal device or a network side device that is establishing or resuming an RRC connection with the terminal device; the indication information is used to indicate a target downlink receiving channel set, or a target downlink receiving carrier set, or a time division multiplexing TDM pattern of each downlink receiving channel of target downlink receiving channels, or a time-division multiplexing TDM pattern of each downlink receiving carrier in the target downlink receiving carrier set; the target downlink receiving channel set is a set formed by a downlink receiving channel with downlink reception; and the target downlink receiving carrier set is a set formed by a downlink receiving carrier with downlink receiving.

Alternatively, the radio frequency unit 101 is configured to: when a preset condition is satisfied, send first indication information to a first network side device;

where the first network side device is a master base station MeNB and/or a secondary base station SeNB that establishes dual connectivity DC with a first subscriber identity module SIM card of the terminal device; the first indication information is used to instruct the first network side device to suspend receiving, on a target uplink sending channel, uplink information sent by the first SIM card, or instruct the first network side device to receive, on a target uplink sending channel, a discontinuous reception DRX pattern of uplink information sent by the terminal device; and the target uplink sending channel is an uplink sending channel used by the first SIM card to send the uplink information to the MeNB and/or an uplink sending channel used by the first SIM card to send the uplink information to the SeNB.

It should be understood that, in this embodiment of this application, the radio frequency unit 101 may be configured to receive and transmit information, or receive and transmit signals during a call. For example, the radio frequency unit 101 receives downlink data from a base station, and transmits the downlink data to the processor 110 for processing; and in addition, transmits uplink data to the base station. Generally, the radio frequency unit 101 includes but is not limited to an antenna, at least one amplifier, a transceiver, a coupler, a low noise amplifier, and a duplexer. In addition, the radio frequency unit 101 may also communicate with another device by using a wireless communications system and network.

The terminal device provides a user with wireless broadband Internet access through the network module 102, for example, helps the user send and receive emails, browse web pages, and access streaming media.

The audio output unit 103 can convert audio data received by the radio frequency unit 101 or the network module 102 or stored in the memory 109 into an audio signal, and output the audio signal as sound. Moreover, the audio output unit 103 may further provide audio output (for example, call signal receiving sound and message receiving sound) related to a specific function performed by the terminal device 100. The audio output unit 103 includes a loudspeaker, a buzzer, a receiver, and the like.

The input unit 104 is configured to receive audio or video signals. The input unit 104 may include a graphics processing unit (CPU) 1041 and a microphone 1042. The graphics processing unit 1041 is configured to process image data of a static picture or a video obtained by an image capture apparatus (for example, a camera) in video capture mode or image capture mode. A processed image frame may be displayed on the display unit 106. The image frame processed by the graphics processing unit 1041 may be stored in the memory 109 (or another storage medium) or sent by using the radio frequency unit 101 or the network module 102. The microphone 1042 may receive sound and can process the sound into audio data. The audio data obtained through processing may be converted, in a telephone call mode, into a format that can be sent to a mobile communications base station via the radio frequency unit 101 for output.

The terminal device 100 further includes at least one sensor 105, such as an optical sensor, a motion sensor, and other sensors. For example, the optical sensor includes an ambient light sensor and a proximity sensor. The ambient light sensor may adjust luminance of the display panel 1061 based on brightness of ambient light. The proximity sensor may turn off the display panel 1061 and/or backlight when the terminal device 100 approaches an ear. As a type of motion sensor, an accelerometer sensor may detect an acceleration value in each direction (generally, three axes), and detect a value and a direction of gravity when the accelerometer sensor is static, and may be configured to recognize a terminal posture (such as switching between landscape and portrait modes, a related game, or magnetometer posture calibration), and perform a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein again.

The display unit 106 is configured to display information entered by a user or information provided for a user. The display unit 106 may include the display panel 1061, and the display panel 1061 may be configured in a form of a liquid crystal display (LCD), an organic light-emitting diode (OLED), or the like.

The user input unit 107 may be configured to receive input numeral or character information, and generate key signal input related to user setting and function control of the terminal device. For example, the user input unit 107 includes a touch panel 1071 and another input device 1072. The touch panel 1071, also called a touch screen, may collect a touch operation of the user on or near the touch panel 1071 (for example, an operation performed by the user on or near the touch panel 1071 by using any suitable object or accessory such as a finger or a stylus). The touch panel 1071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 110, receives a command sent by the processor 110, and executes the command. In addition, the touch panel 1071 may be implemented by using a plurality of types such as a resistive type, a capacitive type, an infrared ray, and a surface acoustic wave. In addition to the touch panel 1071, the user input unit 107 may further include another input device 1072. For example, the another input device 1072 may include but is not limited to a physical keyboard, a function key (such as a volume control key or an on/off key), a trackball, a mouse, and a joystick. Details are not described herein again.

For example, the touch panel 1071 may cover the display panel 1061. When detecting a touch operation on or near the touch panel 1071, the touch panel 1071 transmits the touch operation to the processor 110 to determine a type of a touch event. Then, the processor 110 provides corresponding visual output on the display panel 1061 based on the type of the touch event. Although in FIG. 10, the touch panel 1071 and the display panel 1061 are configured as two independent components to implement input and output functions of the terminal device, in some embodiments, the touch panel 1071 and the display panel 1061 can be integrated to implement the input and output functions of the terminal device. Details are not limited herein.

The interface unit 108 is an interface for connecting an external apparatus to the terminal device 100. For example, the external apparatus may include a wired or wireless headset jack, an external power supply (or a battery charger) port, a wired or wireless data port, a memory card port, a port for connecting an apparatus having an identification module, an audio input/output (I/O) port, a video I/O port, a headset jack, and the like. The interface unit 108 may be configured to receive an input (for example, data information or power) from an external apparatus and transmit the received input to one or more elements in the terminal device 100, or transmit data between the terminal device 100 and the external apparatus.

The memory 109 may be configured to store a software program and various data. The memory 109 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 109 may include a high-speed random access memory, and may further include a non-volatile memory such as at least one magnetic disk storage component, a flash memory component, or another volatile solid-state storage component.

The processor 110 is a control center of the terminal device, connects various parts of the entire terminal device by using various interfaces and circuits, and performs various functions of the terminal device and processes data by running or executing the software programs and/or the modules stored in the memory 109 and invoking data stored in the memory 109, so as to monitor the terminal device as a whole. The processor 110 may include one or more processing units. Preferably, the processor 110 may integrate an application processor and a modem processor. The application processor mainly deals with an operating system, a user interface, an application, and the like. The modem processor mainly deals with wireless communication. It can be understood that the above-mentioned modem processor may not be integrated in the processor 110.

The terminal device 100 may further include the power supply 111 (for example, a battery) configured to supply power to various components. Preferably, the power supply 111 may be logically connected to the processor 110 through a power management system, so as to implement functions such as managing charging, discharging, and power consumption through the power management system.

In addition, the terminal device 100 includes some function modules not shown. Details are not described herein.

Embodiment 5

In some embodiments of the present invention, the terminal device and the like may be divided into functional modules according to the foregoing method examples. For example, functional modules can be divided corresponding to each function, or two or more functions can be integrated into one module. The integrated modules can be implemented in the form of hardware or software function modules. It should be noted that the division of modules in some embodiments of the present invention is illustrative, and is only a logical function division, and there may be other division methods in actual implementation.

Figure 11:
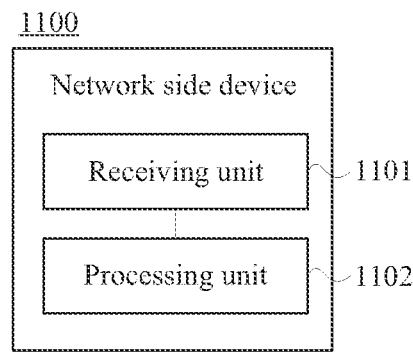
FIG. 11 is a schematic structural diagram of a network side device according to an embodiment of this application.

When an integrated unit is used, FIG. 11 is a possible schematic structural diagram of a network side device according to the foregoing embodiment. The network side device 1100 includes:

a receiving unit 1101, configured to: receive indication information sent by a terminal device, where the indication information is used to indicate that the terminal device does not expect to receive a dual connectivity DC configuration, or the indication information is used to indicate a carrier that the terminal device does not expect to configure; and a processing unit 1102, configured to: in the case where the indication information is used to indicate that the terminal device does not expect to receive a DC configuration, and a first condition is satisfied and a second condition is not satisfied, skip configuring DC for the terminal device; where the first condition is: a condition under which the network side device configures DC for the terminal device in the case where the indication information is not received; or in the case where the indication information is used to indicate the carrier that the terminal device does not expect to configure, and a third condition is satisfied and a fourth condition is not satisfied, skip configuring the carrier indicated by the identifier for the terminal device; where the third condition is: a condition under which the network side device configures the carrier indicated by the identifier for the terminal device in the case where the indication information is not received.

Alternatively, the network side device 1100 includes:

a receiving unit 1101, configured to receive indication information sent by a terminal device, where the network side device has established a radio resource control RRC connection with the terminal device or a network side device is establishing or resuming an RRC connection with the terminal device; the indication information is used to indicate a target downlink receiving, channel set, or a target downlink receiving carrier set, or a time division multiplexing TDM pattern of each downlink receiving channel of target downlink receiving channels, or a time-division multiplexing TDM pattern of each downlink receiving carrier in the target downlink receiving carrier set; the target downlink receiving channel set is a set formed by a downlink receiving channel with downlink reception; and the target downlink receiving carrier set is a set formed by a downlink receiving carrier with downlink receiving; and a processing unit 1102, configured to: when configuring dual connectivity DC for the terminal device, configure a downlink receiving channel of a master cell group MCG and a downlink receiving channel of a secondary cell group SCG based on the indication information.

Optionally, the processing unit 1102 is configured to: configure a downlink receiving channel of the MCG as a first downlink receiving channel, and configure a downlink receiving channel of the SCG as a second downlink receiving channel, where the first downlink receiving channel is a downlink receiving channel occupied by an RRC connection between the network side device and the terminal device, and the second downlink receiving channel does not belong to the target downlink receiving channel set or the second downlink receiving channel is not a downlink receiving channel corresponding to a carrier in the target downlink receiving carrier set;

or;

configure a downlink receiving channel of the SCG as a first downlink receiving channel, and configure a downlink receiving channel of the MCG as a second downlink receiving channel, where the first downlink receiving channel is a downlink receiving channel occupied by an RRC connection between the network side device and the terminal device, and the second downlink receiving channel does not belong to the target downlink receiving channel set or the second downlink receiving channel is not a downlink receiving channel corresponding to a carrier of target downlink receiving carriers;

or;

configure a downlink receiving channel of the MCG as a first downlink receiving channel, configure a downlink receiving channel of the SCG as a third downlink receiving channel, and configure a downlink sending TDM pattern of the SCG as a first TDM pattern, where the first TDM pattern and a second TDM pattern have no intersection set, the second TDM pattern is a downlink receiving TDM pattern of the third downlink receiving channel indicated by the indication information, the first downlink receiving channel is a downlink receiving channel occupied by an RRC connection between the network side device and the terminal device, and the third downlink receiving channel belongs to the target downlink receiving channel set or the third downlink receiving channel is a downlink receiving channel corresponding to a carrier of target downlink receiving carriers;

or;

configure a downlink receiving channel of the SCG as a first downlink receiving channel, configure a downlink receiving channel of the MCG as a third downlink receiving channel, and configure a downlink sending TDM pattern of the MCG as a third TDM pattern, where the third TDM pattern and a second TDM pattern have no intersection set, the second TDM pattern is a downlink receiving TDM pattern of the third downlink receiving channel indicated by the indication information, the first downlink receiving channel is a downlink receiving channel occupied by an RRC connection between the network side device and the terminal device, and the third downlink receiving channel belongs to the target downlink receiving channel set or the third downlink receiving channel is a downlink receiving channel corresponding to a carrier of target downlink receiving carriers;

or;

configure both a downlink receiving channel of the MCG and a downlink receiving channel of the SCG as a first downlink receiving channel, configure a downlink sending TDM pattern of the MCG as a fourth TDM pattern, and configure a downlink sending TDM pattern of the SCG as a fifth TDM pattern, where the first downlink receiving channel is a downlink receiving channel occupied by an RRC connection between the network side device and the terminal device, and the fourth TDM pattern and the fifth TDM pattern have no intersection set.

Optionally, the processing unit 1102 is configured to:

when configuring the downlink receiving channel of the MCG as the first downlink receiving channel, configuring the downlink receiving channel of the SCG as the third downlink receiving channel, and configuring the downlink sending TDM pattern of the SCG as the first TDM pattern, send first configuration information to the terminal device, where the first configuration information is used to configure the downlink sending TDM pattern of the SCG as the first TDM pattern;

when configuring the downlink receiving channel of the SCG as the first downlink receiving channel, configuring the downlink receiving channel of the MCG as the third downlink receiving channel, and configuring the downlink sending TDM pattern of the MCG as the third TDM pattern, send second configuration information to the terminal device, where the second configuration information is used to configure the downlink sending TDM pattern of the MCG as the third TDM pattern; and when configuring both the downlink receiving channel of the MCG and the downlink receiving channel of the SCG as the first downlink receiving channel, configuring the downlink sending TDM pattern of the MCG as the fourth TDM pattern, and configuring the downlink sending TDM pattern of the SCG as the fifth TDM pattern, send third configuration information to the terminal device, where the third configuration information is used to configure the downlink sending TDM pattern of the MCG as the fourth TDM pattern and configure the downlink sending TDM pattern of the SCG as the fifth TDM pattern.

Alternatively, the network side device 1100 includes:

a receiving unit 1101, configured to receive indication information sent by a target terminal device; and a processing unit 1102, configured to: in the case where the indication information is used to instruct the network side device to suspend receiving, on a target uplink sending channel or a target uplink sending carrier, uplink information sent by the terminal device, suspend receiving, on the target uplink sending channel or the target uplink sending carrier, the uplink information sent by the terminal device; or in the case where the indication information is used to instruct the network side device to receive, on a target uplink sending channel or a target uplink sending carrier according to a target DRX pattern, the uplink information sent by the terminal device, receive, on the target uplink sending channel or the target uplink sending carrier according to the target DRX pattern, the uplink information sent by the terminal device.

Figure 12:
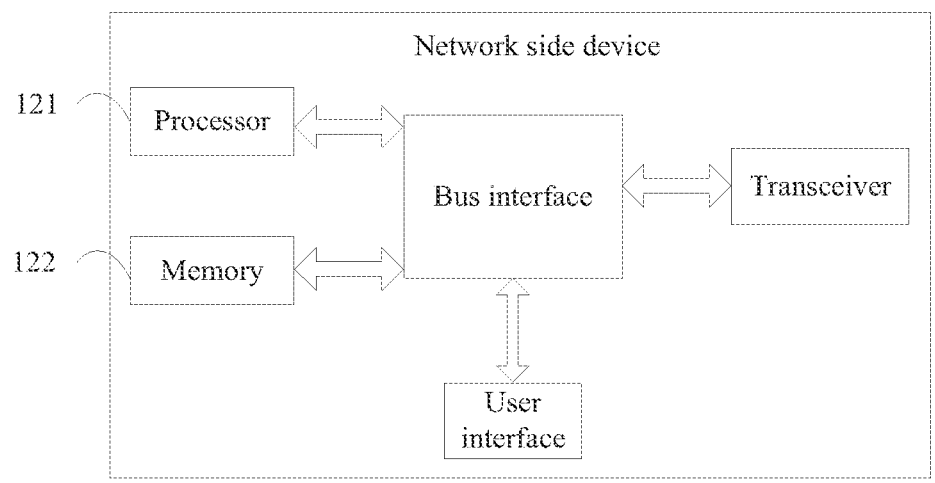
FIG. 12 is a schematic structural diagram of hardware of a network side device according to an embodiment of this application.

An embodiment of the application further provides a network side device, including the processor 121 and the memory 122, and a computer program stored in the memory 122 and executable on the processor 121 shown in FIG. 12, where the computer program, when executed by the processor 121, implements the processes of the wireless communication methods in the foregoing embodiments, and the same technical effects can be achieved. To avoid repetition, details are not described herein again.

An embodiment of this application further provides a non-transitory computer-readable storage medium, storing a computer program, where the computer program, when executed by a processor, implements the plurality of processes of the wireless communication methods in the foregoing embodiments, and the same technical effects can be achieved. To avoid repetition, details are not described herein again. The non-transitory computer-readable storage medium is, for example, a read-only memory (ROM), a random access memory (RAM), a magnetic disk, or an optical disc.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In the absence of more restrictions, an element defined by the statement "including a . . . " does not exclude another same element in a process, method, article, or apparatus that includes the element.

According to the foregoing descriptions of the implementations, a person skilled in the art may clearly understand that the foregoing methods in the embodiments may be implemented by using software plus a required universal hardware platform, or certainly may be implemented by using hardware. However, in many cases, the former is a better implementation. Based on such an understanding, the technical solutions of this application essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network side device, or the like) to perform the method described in the plurality of embodiments of this application.

The embodiments of this application are described above with reference to the accompanying drawings, but this application is not limited to the foregoing specific implementations. The foregoing specific implementations are merely schematic instead of restrictive. Under enlightenment of this application, a person of ordinary skills in the art may make many forms without departing from aims of this application and the protection scope of claims, all of which fall within the protection of this application.

What is claimed is:

1. A wireless communication method, applied to a terminal device equipped with multiple subscriber identity module (SIM) cards, wherein the method comprises:

determining that all downlink receiving channels of the terminal device have downlink receptions; and sending indication information to at least one target network side device, in response to a determination that all downlink receiving channels of the terminal device have downlink receptions;

wherein the target network side device is a network side device corresponding to one of the multiple SIM cards, the target network side device has established a radio resource control (RRC) connection with the terminal device, or is establishing or resuming an RRC connection with the terminal device, and the indication information is used to indicate that the terminal device does not expect to receive a dual connectivity (DC) configuration, and/or a carrier that the terminal device does not expect to configure.

2. The method according to claim 1, wherein the sending indication information to at least one target network side device comprises:

sending the indication information to a network side device corresponding to any SIM card; wherein the network side device corresponding to any SIM card is a network side device that has established an RRC connection with the SIM card or a network side device that is establishing or resuming an RRC connection with the SIM card.

3. The method according to claim 1, wherein the sending indication information to at least one target network side device comprises:

in a case where at least one first SIM card of the terminal device has established an RRC connection with the target network side device or is establishing or resuming an RRC connection with the target network side device, and at least one second SIM card of the terminal device is in an idle state, sending the indication information to at least one target network side device corresponding to the at least one first SIM card.

4. A terminal device equipped with multiple subscriber identity module (SIM) cards, comprising: a processor, a memory, and a computer program that is stored in the memory and executable on the processor, wherein the computer program, when executed by the processor, causes the terminal device to perform:

determining that all downlink receiving channels of the terminal device have downlink receptions; and sending indication information to at least one target network side device, in response to a determination that all downlink receiving channels of the terminal device have downlink receptions; wherein the target network side device is a network side device corresponding to one of the multiple SIM cards, and the target network side device has established a radio resource control (RRC) connection with the terminal device or is establishing or resuming an RRC connection with the terminal device; and the indication information is used to indicate that the terminal device does not expect to receive a dual connectivity (DC) configuration, and/or a carrier that the terminal device does not expect to configure.

5. The terminal device according to claim 4, wherein the computer program, when executed by the processor, causes the terminal device to perform:

sending the indication information to a network side device corresponding to any SIM card; wherein the network side device corresponding to any SIM card is a network side device that has established an RRC connection with the SIM card or a network side device that is establishing or resuming an RRC connection with the SIM card.

6. The terminal device according to claim 4, wherein the sending indication information to at least one target network side device comprises:

in a case where at least one first SIM card of the terminal device has established an RRC connection with the target network side device or is establishing or resuming an RRC connection with the target network side device, and at least one second SIM card of the terminal device is in an idle state, sending the indication information to at least one target network side device corresponding to the at least one first SIM card.

7. A non-transitory computer-readable storage medium, wherein the non-transitory computer-readable storage medium stores a computer program, and the computer program, when executed by a processor, causes the processor to perform steps of the wireless communication method according to claim 1.

8. A wireless communication method, applied to a network side device, wherein the method comprises:

receiving indication information sent by a terminal device equipped with multiple subscriber identity module (SIM) cards, wherein the indication information is used to indicate that the terminal device does not expect to receive a dual connectivity (DC) configuration and/or a carrier that the terminal device does not expect to configure; and the network side device is a network side device corresponding to one of the multiple SIM cards, and the network side device has established a radio resource control (RRC) connection with the terminal device or is establishing or resuming an RRC connection with the terminal device; and in response to that the indication information is used to indicate that the terminal device does not expect to receive a DC configuration, skipping configuring DC for the terminal device in a case where a first condition is satisfied and a second condition is not satisfied; wherein the first condition is a condition under which the network side device configures DC for the terminal device in a case where the indication information is not received; and/or in response to that the indication information is used to indicate a carrier that the terminal device does not expect to configure, skipping configuring the indicated carrier for the terminal device in a case where a third condition is satisfied and a fourth condition is not satisfied; wherein the third condition is a condition under which the network side device configures the carrier indicated by the identifier for the terminal device in a case where the indication information is not received.

9. A network side device equipped with multiple subscriber identity module (SIM) cards, comprising: a processor, a memory, and a computer program that is stored in the memory and executable on the processor, wherein the computer program, when executed by the processor, causes the network side device to perform the step of the wireless communication method according to claim 8.

10. A non-transitory computer-readable storage medium, wherein the non-transitory computer-readable storage medium stores a computer program, and the computer program, when executed by a processor, causes the processor to perform the step of the wireless communication method according to claim 8.

* * * * *